(12) United States Patent
Apger et al.

(10) Patent No.: US 12,711,221 B2
(45) **Date of Patent: *Aug. 18, 2026**

(54) GRAPHICAL USER INTERFACE FOR PRESENTATION OF NETWORK SECURITY RISK AND THREAT INFORMATION

(71) Applicant: Splunk Inc., San Francisco, CA (US)

(72) Inventors: James Apger, McKinney, TX (US); Allison Lindsey Drake, Rancho Santa Fe, CA (US); James Irwin Ebeling, Fort Myers, FL (US); Orville Esoy, San Diego, CA (US); Bhooshan Kulkarni, El Segundo, CA (US); Marquis L. Montgomery, Cumming, GA (US); Daniel Trenkner, Encinitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/761,554

(22) Filed: Jul. 2, 2024

(65) Prior Publication Data

US 2024/0354401 A1 Oct. 24, 2024

Related U.S. Application Data

(63) Continuation of application No. 17/515,328, filed on Oct. 29, 2021, now Pat. No. 12,061,691.

(51) Int. Cl.

*G06F 21/55* (2013.01)
*G06F 3/0482* (2013.01)
*G06F 21/57* (2013.01)

(52) U.S. Cl.

CPC .......... *G06F 21/552* (2013.01); *G06F 3/0482* (2013.01); *G06F 21/577* (2013.01); *G06F 2221/2101* (2013.01)

(58) Field of Classification Search

CPC .... G06F 21/552; G06F 3/0482; G06F 21/577; G06F 2221/2101; H04L 63/1425; H04L 63/1441; H04L 63/1416; H04L 63/1433

(Continued)

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |

(Continued)

OTHER PUBLICATIONS

Splunk Enterprise 8.0.0 Overview, available online, retrieved May 20, 2020 from docs.splunk.com, 17 pages.

(Continued)

*Primary Examiner* — Meng Vang

(74) *Attorney, Agent, or Firm* — Baker Botts L.L.P.

(57) ABSTRACT

A graphical user interface (GUI) for presentation of network security risk and threat information is disclosed. A listing is generated of incidents identified by use of event data obtained from a networked computing environment. A particular incident is determined to be associated with a risk object, wherein a risk object is a component of the networked computing environment. The listing is populated with a name associated with the risk object. Risk events associated with the incident are determined, wherein each risk event contributes to a risk score for the incident. The risk score indicates a potential security issue associated with the risk object. The listing is populated with the risk score and a summary of the events. An action is associated with the listing, for triggering display of additional information associated with the risk object. The listing can be displayed in a first display screen of the GUI.

20 Claims, 31 Drawing Sheets

(58) Field of Classification Search
USPC .............................................................. 726/1
See application file for complete search history.

(56) References Cited

U.S. PATENT DOCUMENTS

| | | | | |
|---|---|---|---|---|
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 10,673,880 | B1 * | 6/2020 | Pratt | H04L 63/1425 |
| 11,201,890 | B1 * | 12/2021 | Coull | G06F 16/9024 |
| 2007/0192474 | A1 * | 8/2007 | Decasper | H04L 67/306 709/223 |
| 2017/0046519 | A1 * | 2/2017 | Cam | G06N 7/01 |
| 2017/0063912 | A1 * | 3/2017 | Muddu | G06N 5/022 |
| 2018/0316695 | A1 * | 11/2018 | Esman | H04L 63/1433 |
| 2019/0098106 | A1 | 3/2019 | Mungel et al. | |
| 2020/0304537 | A1 | 9/2020 | Zorlular et al. | |
| 2020/0311630 | A1 | 10/2020 | Risoldi et al. | |
| 2020/0412758 | A1 | 12/2020 | Trivellato et al. | |
| 2021/0203673 | A1 | 7/2021 | Dos Santos et al. | |
| 2021/0286895 | A1 | 9/2021 | Yang et al. | |
| 2022/0019674 | A1 | 1/2022 | Frey et al. | |
| 2022/0261487 | A1 | 8/2022 | Lounsberry | |

OTHER PUBLICATIONS

Splunk Cloud 8.0.2004 User Manual, available online, retrieved May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved May 20, 2020, 6 pages.

Carraso, David, "Exploring Splunk," published by CITO Research, New York, NY, Apr. 2012, 156 pages.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

International Search Report and Written Opinion mailed Feb. 4, 2022 for International Patent Application No. PCT/US2021/057450, 12 pages.

"Enterprise Security Solutions: Splunk", Splunk.com; retrieved online from url: https://web.archive.org/web/20201020211320/https://www.splunk.com/en_us/software/enterpris e-security.html, Oct. 20, 2020, pp. 1-10.

* cited by examiner

302

302A 127.0.0.1 -- eva [10/Oct/2000:13:55:36-0700] "GET/apache.gif HTTP/1.0" 200 2326 0.0947
127.0.0.1 -- emerson [10/Oct/2000:13:56:36-0700] "GET/eastwood.gif HTTP/1.0" 200 2980 0.0899

302C 302B 127.0.0.3 -- eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif 302E 302D 91.205.189.15 - - [28/Apr/2014:18:22:16] "GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

304

```
docker: {
        container_id: f7360a148a670c4c257f4ee024be81284b6017d72ae41ea8ee5d
}
kubernetes: {
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal
}
log: I0503 23:04:12.595203     1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026

stream: stdout
time: 2018-05-03T23:04:12.619948395Z
}
```

304A

304B

306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

| 1 | 2 | 3 | 4 | 5 | 6 | 7 | 8 | 9 | 10 | 11 | 12 |
|---|---|---|---|---|---|---|---|---|---|---|---|
| 16:21:20.000 3/1/17 | 16:21:45.000 3/1/17 | 16:22:30.000 3/1/17 | 16:22:53.020 3/1/17 | 16:22:54.815 3/1/17 | 16:24:15.100 3/1/17 | 16:24:37.610 3/1/17 | 16:26:01.000 3/1/17 | 16:27:50.000 3/1/17 | 16:27:56.470 3/1/17 | 16:28:08.120 3/1/17 | 16:28:17.000 3/1/17 |
| Address1 | Address2 | Address3 | Address4 | Address5 | Address6 | Address7 | Address8 | Address9 | Address10 | Address11 | Address12 |

500

Correlation Search

Search Name: Activity from Expired User Identity 507

App: SA-IdentityManagement 515

UI Dispatch Context: Enterprise Security

Set an app to use for links such as the drill-down search in a notable event or links in an email adaptive response action. If None, uses the Application Context.

Description: Alerts when an event is discovered from a user associated with identity that is now expired (that is, the end date of the identity has been passed). 510

Mode: Guided | Manual

Search: 520

```
| from datamodel:"Identity_Management"."Expired_Identity_Activity" | stats
    max("_time") as "lastTime",latest("_raw") as "orig_raw",count by
    "expired_user" | rename "expired_user" as "user"
```

Annotations

522

CIS 20: Type an attribute and press enter

Kill Chain: Type an attribute and press enter

MITRE ATT&CK: T1078 × T1199 ×

NIST: Type an attribute and press enter

FIG. 5A

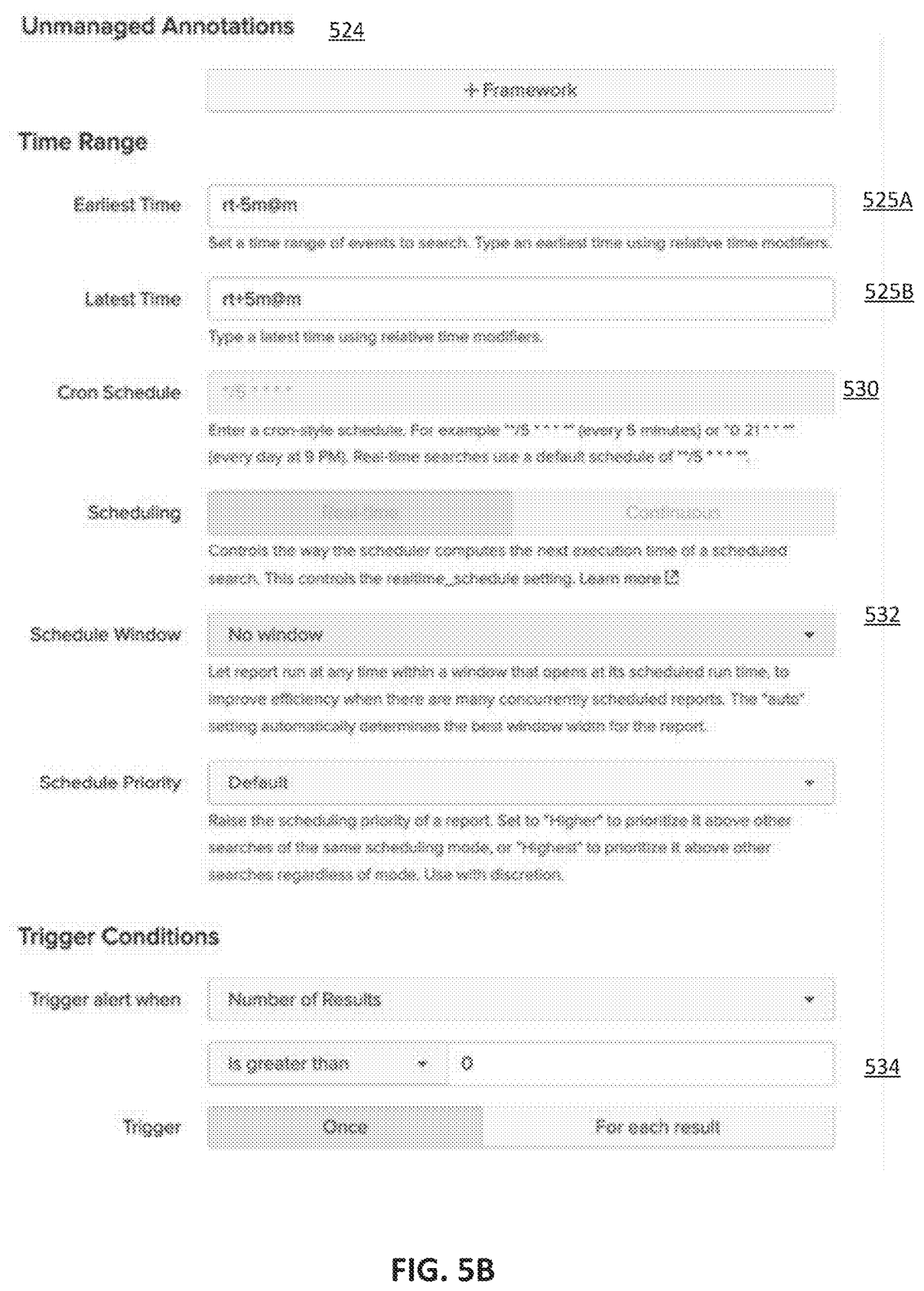

Unmanaged Annotations 524

+ Framework

Time Range

Earliest Time: rt-5m@m 525A

Set a time range of events to search. Type an earliest time using relative time modifiers.

Latest Time: rt+5m@m 525B

Type a latest time using relative time modifiers.

Cron Schedule: */5 * * * * 530

Enter a cron-style schedule. For example "*/5 * * * *" (every 5 minutes) or "0 21 * * *" (every day at 9 PM). Real-time searches use a default schedule of "*/5 * * * *".

Scheduling: | Continuous

Controls the way the scheduler computes the next execution time of a scheduled search. This controls the realtime_schedule setting. Learn more Schedule Window: No window 532

Let report run at any time within a window that opens at its scheduled run time, to improve efficiency when there are many concurrently scheduled reports. The "auto" setting automatically determines the best window width for the report.

Schedule Priority: Default

Raise the scheduling priority of a report. Set to "Higher" to prioritize it above other searches of the same scheduling mode, or "Highest" to prioritize it above other searches regardless of mode. Use with discretion.

Trigger Conditions

Trigger alert when: Number of Results is greater than: 0 534

Trigger: Once | For each result

FIG. 5B

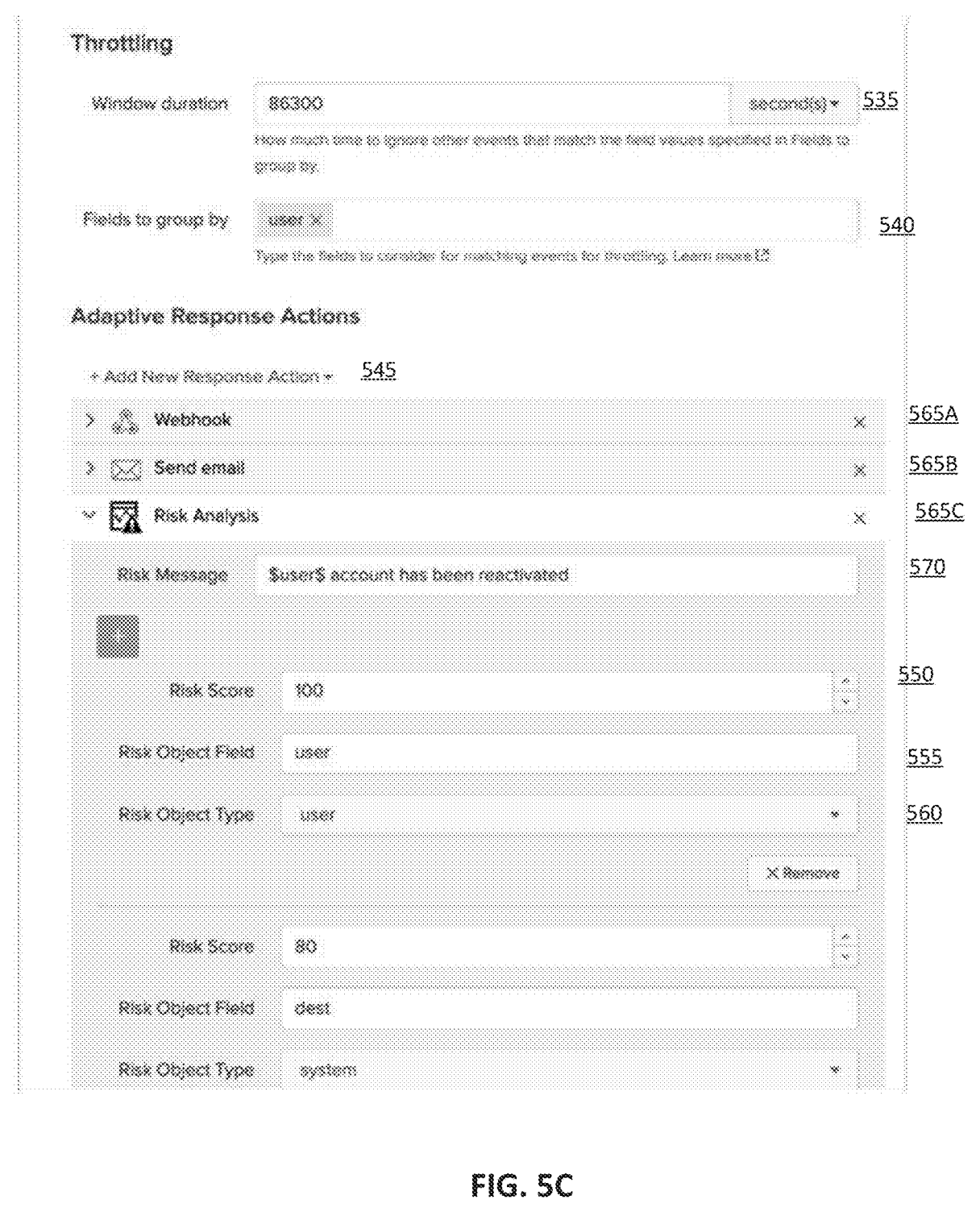

Throttling

Window duration 86300 second(s) 535

How much time to ignore other events that match the field values specified in Fields to group by.

Fields to group by user × 540

Type the fields to consider for matching events for throttling. Learn more

Adaptive Response Actions

+ Add New Response Action 545

Webhook 565A

Send email 565B

Risk Analysis 565C

Risk Message $user$ account has been reactivated 570

Risk Score 100 550

Risk Object Field user 555

Risk Object Type user 560

× Remove

Risk Score 80

Risk Object Field dest

Risk Object Type system

FIG. 5C

| i | Time | Event |
|---|---|---|
| > | 08/31/2017 8:10:00.000 PM | 08/31/2017 12:42:38 -0700, search_name="Threat - RR - Non-Standard Port Web Traffic - System - Rule", search_now=1568463000.000, info_min_time=1482066600.000, info_max_time=1568463000.000, info_search_time=1568463006.836, url="http://ec2-52-40-10-231.us-west-2.compute.amazonaws.com:8088:8088/services/collector/raw", count=868, impact=medium, src_ip="10.0.2.105", dest_ip="52.40.10.231", threat_object="52.40.10.231", threat_object_type="ip", src_dns="wrk-fmaltes.frothly.local", ut_port=8088, dest_dns="ec2-52-40-10-231.us-west-2.compute-amazonaws.com", risk_rule_confidence=low, risk_rule_impact_num=60, rule_attack_tactic_technique="command_and_control - T1065 - Uncommonly Used Port - https://attack.mitre.org/techniques/T1065/", risk_rule_confidence_num="0.3", confidence=low, risk_score=18, orig_sourcetype="stream:http", src_system="wrk-fmaltes.frothly.local", risk_modifier_count_vuln=0, risk_modifier_count_system=0, risk_object_type=system, risk_rule_impact=medium, dest_system="ec2-52-40-10-231.us-west-2.compute.amazonaws.com", risk_object="ec2-52-40-10-231.us-west-2.compute.amazonaws.com", next_cron_time="1504210200.000000"<br>host = OD-FM-NA-i-00d3cc13d300ce9d5.amazonaws.com source = Threat - RR - Non-Standard Port Web Traffic - System - Rule sourcetype = stash |
| > | 08/31/2017 8:10:00.000 PM | 08/31/2017 12:42:38 -0700, search_name="Threat - RR - Non-Standard Port Web Traffic - System - Rule", search_now=1568463000.000, info_min_time=1482066600.000, info_max_time=1568463000.000, info_search_time=1568463006.836, url="http://ec2-52-40-10-231.us-west-2.compute.amazonaws.com:8088:8088/services/collector/raw", count=868, impact=medium, src_ip="10.0.2.105", dest_ip="52.40.10.231", threat_object="52.40.10.231", threat_object_type="ip", src_dns="wrk-fmaltes.frothly.local", ut_port=8088, dest_dns="ec2-52-40-10-231.us-west-2.compute-amazonaws.com", risk_rule_confidence=low, risk_rule_impact_num=60, rule_attack_tactic_technique="command_and_control - T1065 - Uncommonly Used Port - https://attack.mitre.org/techniques/T1065/", risk_rule_confidence_num="0.3", confidence=low, risk_score=18, orig_sourcetype="stream:http", src_system="wrk-fmaltes.frothly.local", risk_modifier_count_vuln=0, risk_modifier_count_system=0, risk_object_type=system, risk_rule_impact=medium, dest_system="ec2-52-40-10-231.us-west-2.compute.amazonaws.com", risk_object="wrk-fmaltes.frothly.local", next_cron_time="1504210200.000000"<br>host = OD-FM-NA-i-00d3cc13d300ce9d5.amazonaws.com source = Threat - RR - Non-Standard Port Web Traffic - System - Rule sourcetype = stash |

| i | ☐ | Time | Risk Object | Title | Urgency | Status | Owner | Actions |
|---|---|---|---|---|---|---|---|---|
| > | ☐ | 8/26/17 9:15:00.000 AM | wrk-btun.frothly.local | RBA: ATT&CK Tactic threshold exceeded (>=3) over previous 7 days for system=wrk-btun.frothly.local spanning 10 Risk Rules, 5 ATT&CK tactics, and 11 ATT&CK techniques | High | New | Unassigned | ▼ |
| > | ☐ | 8/26/17 9:15:00.000 AM | venus.frothly.local | RBA: ATT&CK Tactic threshold exceeded (>=3) over previous 7 days for system=venus.frothly.local spanning 4 Risk Rules, 4 ATT&CK tactics, and 4 ATT&CK techniques | Low | New | Unassigned | ▼ |
| > | ☐ | 8/26/17 9:15:00.000 AM | wrk-btun.frothly.local | RBA: 24 hour risk threshold exceeded for system=wrk-btun.frothly.local spanning 2 Risk Rules, 2 ATT&CK tactics, and 3 ATT&CK techniques | Medium | New | Unassigned | ▼ |
| > | ☐ | 8/25/17 6:32:19.000 PM | | Malicious Document on wrk-btun | High | Unassigned | Administrator | ▼ |
| > | ☐ | 8/24/17 5:20:00.000 AM | service3 | RBA: ATT&CK Tactic threshold exceeded (>=3) over previous 7 days for user=service3 spanning 4 Risk Rules, 4 ATT&CK tactics, and 4 ATT&CK techniques | Medium | New | Unassigned | ▼ |
| > | ☐ | 8/24/17 5:20:00.000 AM | service3 | RBA: 24 hour risk threshold exceeded for user=service3 spanning 1 Risk Rules, 1 ATT&CK tactics, and 1 ATT&CK techniques | Low | New | Unassigned | ▼ |
| > | ☐ | 8/24/17 5:15:00.000 AM | service3 | RBA: 24 hour risk threshold exceeded for user=service3 spanning 3 Risk Rules, 3 ATT&CK tactics, and 3 ATT&CK techniques | Low | New | Unassigned | ▼ |
| > | ☐ | 8/24/17 4:20:00.000 AM | billy.tun | RBA: ATT&CK Tactic threshold exceeded (>=3) over previous 7 days for user=billy.tun spanning 12 Risk Rules, 6 ATT&CK tactics, and 11 ATT&CK techniques | High | New | Unassigned | ▼ |
| > | ☐ | 8/24/17 4:20:00.000 AM | wrk-btun.frothly.local | RBA: 24 hour risk threshold exceeded for system=wrk-btun.frothly.local spanning 8 Risk Rules, 5 ATT&CK tactics, and 9 ATT&CK techniques | High | New | Unassigned | ▼ |
| > | ☐ | 8/24/17 4:20:00.000 AM | billy.tun | RBA: 24 hour risk threshold exceeded for user=billy.tun spanning 12 Risk Rules, 6 ATT&CK tactics, and 11 ATT&CK techniques | High | New | Unassigned | ▼ |
| > | ☐ | 8/23/17 9:59:57.000 PM | nc.exe | Threat Activity Detected (nc.exe) | Low | New | Unassigned | ▼ |
| > | ☐ | 8/23/17 9:36:15.000 PM | nc.exe | Threat Activity Detected (nc.exe) | Low | New | Unassigned | ▼ |

1100 splunk > enterprise Enterprise Security ▾ Carl ▾ ① Messages ▾ Settings ▾ Activity ▾ Help ▾ Find Security Posture | Incident Review | Investigations | Glass Tables | Security Intelligence ▾ | Security Domains ▾ | Audit ▾ | Search ▾ | Configure ▾ | Enterprise Security

Figure 11A:
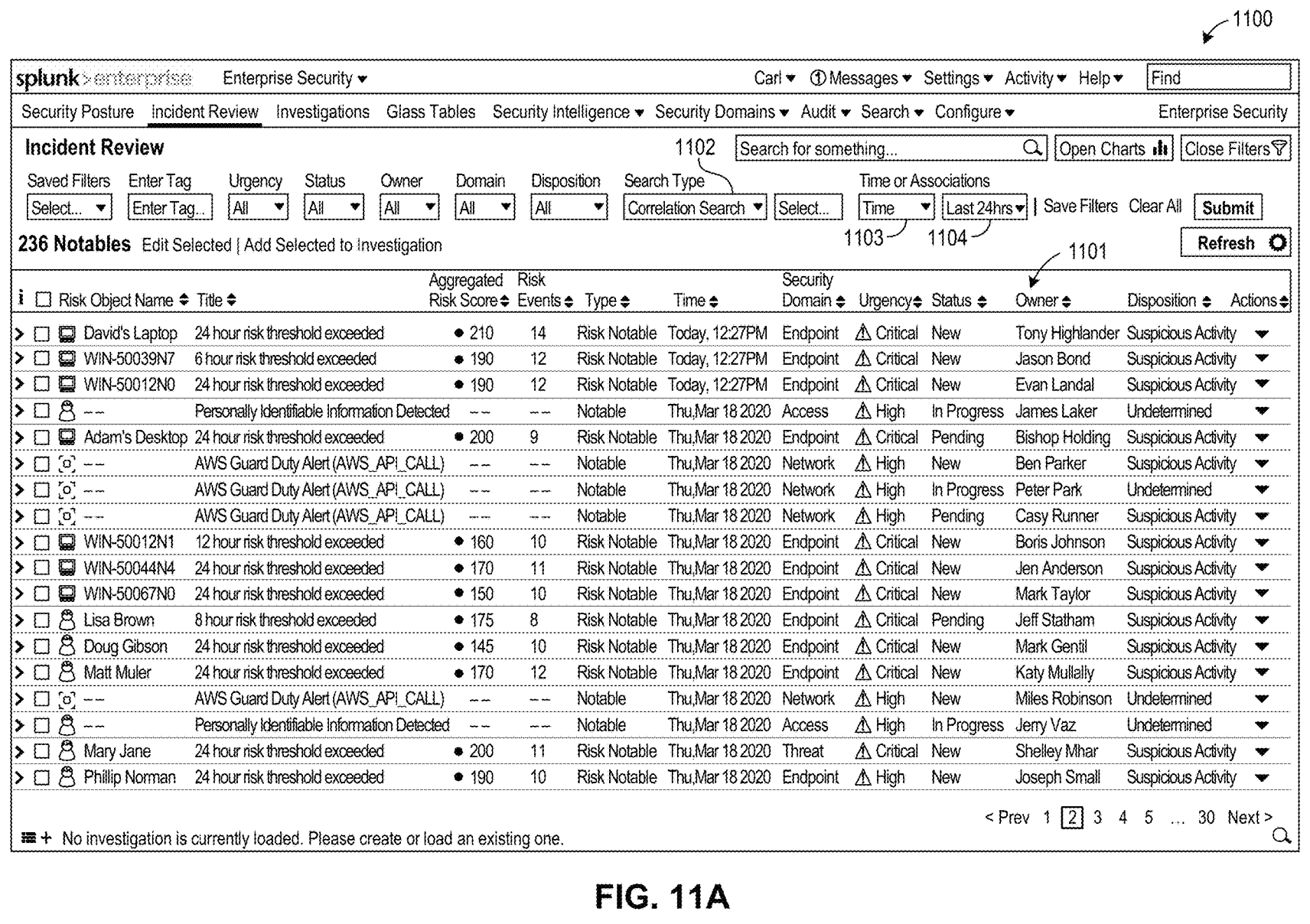

Incident Review

1102 Search for something... Open Charts Close Filters

Saved Filters: Select... | Enter Tag: Enter Tag... | Urgency: All | Status: All | Owner: All | Domain: All | Disposition: All | Search Type: Correlation Search, Select... | Time or Associations: Time (1103), Last 24hrs (1104) | Save Filters | Clear All | Submit

236 Notables Edit Selected | Add Selected to Investigation Refresh

1101

| Risk Object Name | Title | Aggregated Risk Score | Risk Events | Type | Time | Security Domain | Urgency | Status | Owner | Disposition | Actions |
|---|---|---|---|---|---|---|---|---|---|---|---|
| David's Laptop | 24 hour risk threshold exceeded | ● 210 | 14 | Risk Notable | Today, 12:27PM | Endpoint | ⚠ Critical | New | Tony Highlander | Suspicious Activity | ▾ |
| WIN-50039N7 | 6 hour risk threshold exceeded | ● 190 | 12 | Risk Notable | Today, 12:27PM | Endpoint | ⚠ Critical | New | Jason Bond | Suspicious Activity | ▾ |
| WIN-50012N0 | 24 hour risk threshold exceeded | ● 190 | 12 | Risk Notable | Today, 12:27PM | Endpoint | ⚠ Critical | New | Evan Landal | Suspicious Activity | ▾ |
| -- | Personally Identifiable Information Detected | -- | -- | Notable | Thu,Mar 18 2020 | Access | ⚠ High | In Progress | James Laker | Undetermined | ▾ |
| Adam's Desktop | 24 hour risk threshold exceeded | ● 200 | 9 | Risk Notable | Thu,Mar 18 2020 | Endpoint | ⚠ Critical | Pending | Bishop Holding | Suspicious Activity | ▾ |
| -- | AWS Guard Duty Alert (AWS_API_CALL) | -- | -- | Notable | Thu,Mar 18 2020 | Network | ⚠ High | New | Ben Parker | Suspicious Activity | ▾ |
| -- | AWS Guard Duty Alert (AWS_API_CALL) | -- | -- | Notable | Thu,Mar 18 2020 | Network | ⚠ High | In Progress | Peter Park | Undetermined | ▾ |
| -- | AWS Guard Duty Alert (AWS_API_CALL) | -- | -- | Notable | Thu,Mar 18 2020 | Network | ⚠ High | Pending | Casy Runner | Suspicious Activity | ▾ |
| WIN-50012N1 | 12 hour risk threshold exceeded | ● 160 | 10 | Risk Notable | Thu,Mar 18 2020 | Endpoint | ⚠ Critical | New | Boris Johnson | Suspicious Activity | ▾ |
| WIN-50044N4 | 24 hour risk threshold exceeded | ● 170 | 11 | Risk Notable | Thu,Mar 18 2020 | Endpoint | ⚠ Critical | New | Jen Anderson | Suspicious Activity | ▾ |
| WIN-50067N0 | 24 hour risk threshold exceeded | ● 150 | 10 | Risk Notable | Thu,Mar 18 2020 | Endpoint | ⚠ Critical | New | Mark Taylor | Suspicious Activity | ▾ |
| Lisa Brown | 8 hour risk threshold exceeded | ● 175 | 8 | Risk Notable | Thu,Mar 18 2020 | Endpoint | ⚠ Critical | Pending | Jeff Statham | Suspicious Activity | ▾ |
| Doug Gibson | 24 hour risk threshold exceeded | ● 145 | 10 | Risk Notable | Thu,Mar 18 2020 | Endpoint | ⚠ Critical | New | Mark Gentil | Suspicious Activity | ▾ |
| Matt Muler | 24 hour risk threshold exceeded | ● 170 | 12 | Risk Notable | Thu,Mar 18 2020 | Endpoint | ⚠ Critical | New | Katy Mullally | Suspicious Activity | ▾ |
| -- | AWS Guard Duty Alert (AWS_API_CALL) | -- | -- | Notable | Thu,Mar 18 2020 | Network | ⚠ High | New | Miles Robinson | Undetermined | ▾ |
| -- | Personally Identifiable Information Detected | -- | -- | Notable | Thu,Mar 18 2020 | Access | ⚠ High | In Progress | Jerry Vaz | Undetermined | ▾ |
| Mary Jane | 24 hour risk threshold exceeded | ● 200 | 11 | Risk Notable | Thu,Mar 18 2020 | Threat | ⚠ Critical | New | Shelley Mhar | Suspicious Activity | ▾ |
| Phillip Norman | 24 hour risk threshold exceeded | ● 190 | 10 | Risk Notable | Thu,Mar 18 2020 | Endpoint | ⚠ High | New | Joseph Small | Suspicious Activity | ▾ |

< Prev 1 2 3 4 5 ... 30 Next >

No investigation is currently loaded. Please create or load an existing one.

Incidents 347 results | Search... | Last 24 Hours | Status | Owner | Urgency | All Filters | 1112 | Sort

| Risk Object Name | Title | Aggregated Risk Score | Risk Events | Type | Time | Security Domain | Urgency | Status | Owner | Actions |
|---|---|---|---|---|---|---|---|---|---|---|
| David's Laptop | 24 hour risk threshold exceeded | 421 | 7 | Risk Based Alert | Today, 12:27PM | Endpoint | Low | New | (MM) Marquis Montgomery | Action |
| WIN-50039N7 | 6 hour risk threshold exceeded | 190 | 12 | Risk Based Alert | Thu,Mar 18 2020 | Network | Low | In Progress | (JE) James Ebeling | Action |
| WIN-50012N0 | 24 hour risk threshold exceeded | 190 | 12 | Risk Based Alert | Thu,Mar 18 2020 | Threat | Critical | Pending | (OE) Orville Esoy | Action |
| -- | Personally Identifiable Information Detected | 160 | 11 | Notable | Thu,Mar 18 2020 | Access | Critical | Closed | (DT) Dan Trenkner | Action |
| Adam's Desktop | 24 hour risk threshold exceeded | 200 | 9 | Risk Based Alert | Thu,Mar 18 2020 | Endpoint | Medium | New | (AD) Allison Drake | Action |
| -- | AWS Guard Duty Alert (AWS_API_CALL) | 150 | 12 | Notable | Thu,Mar 18 2020 | Network | Critical | In Progress | (NM) Nikki Minard | Action |
| -- | AWS Guard Duty Alert (AWS_API_CALL) | 145 | 8 | Notable | Thu,Mar 18 2020 | Threat | Critical | Pending | (MM) Marquis Montgomery | Action |
| -- | AWS Guard Duty Alert (AWS_API_CALL) | 165 | 12 | Notable | Thu,Mar 18 2020 | Access | Low | Closed | (JE) James Ebeling | Action |
| WIN-50012N1 | 12 hour risk threshold exceeded | 160 | 12 | Risk Based Alert | Thu,Mar 18 2020 | Endpoint | Critical | New | (OE) Orville Esoy | Action |
| WIN-50044N4 | 24 hour risk threshold exceeded | 170 | 10 | Risk Based Alert | Thu,Mar 18 2020 | Network | Critical | In Progress | (DT) Dan Trenkner | Action |
| WIN-50067N0 | 24 hour risk threshold exceeded | 150 | 10 | Risk Based Alert | Thu,Mar 18 2020 | Threat | Low | Pending | (AD) Allison Drake | Action |
| Lisa Brown | 8 hour risk threshold exceeded | 175 | 9 | Risk Based Alert | Thu,Mar 18 2020 | Access | Medium | Closed | (NM) Nikki Minard | Action |
| Doug Gibson | 24 hour risk threshold exceeded | 145 | 10 | Risk Based Alert | Thu,Mar 18 2020 | Endpoint | Medium | New | (MM) Marquis Montgomery | Action |
| Matt Muler | 24 hour risk threshold exceeded | 170 | 12 | Risk Based Alert | Thu,Mar 18 2020 | Network | Critical | In Progress | (JE) James Ebeling | Action |
| WIN-50039N7 | 24 hour risk threshold exceeded | 175 | 10 | Risk Based Alert | Thu,Mar 18 2020 | Threat | Low | Pending | (OE) Orville Esoy | Action |
| -- | AWS Guard Duty Alert (AWS_API_CALL) | 150 | 10 | Notable | Thu,Mar 18 2020 | Access | Low | Closed | (DT) Dan Trenkner | Action |
| -- | Personally Identifiable Information Detected | 180 | 12 | Notable | Thu,Mar 18 2020 | Network | Low | New | (AD) Allison Drake | Action |
| Mary Jane | 24 hour risk threshold exceeded | 200 | 11 | Risk Based Alert | Thu,Mar 18 2020 | Threat | Low | In Progress | (NM) Nikki Minard | Action |
| Ben Parker | 24 hour risk threshold exceeded | 190 | 10 | Risk Based Alert | Thu,Mar 18 2020 | Access | Medium | Pending | (MM) Marquis Montgomery | Action |

< Prev 1 of 30 pages Next >

FIG. 11B

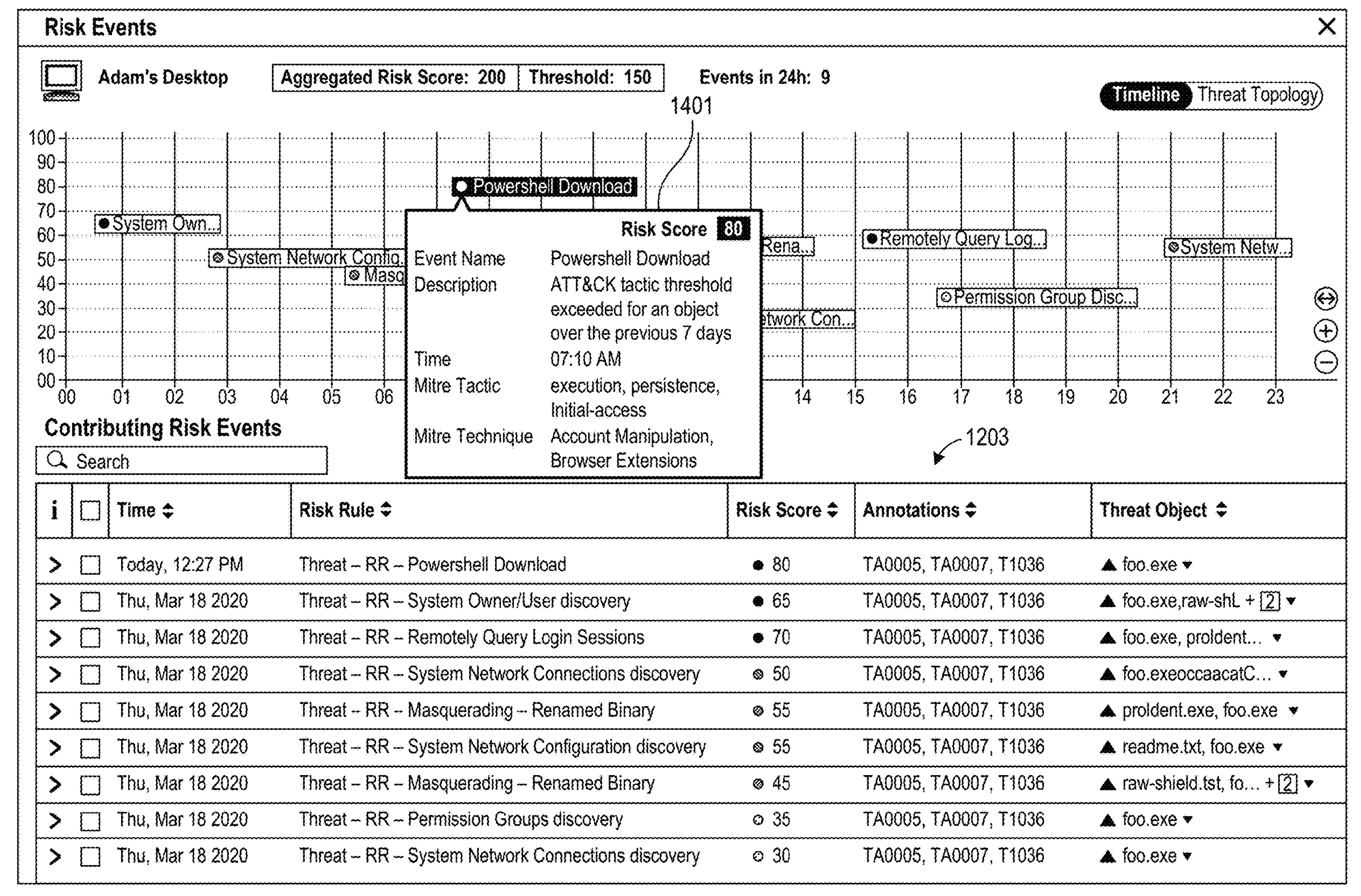

| i | ☐ | Time | Risk Rule | Risk Score | Annotations | Threat Object |
|---|---|---|---|---|---|---|
| > | ☐ | Today, 12:27 PM | Threat – RR – Powershell Download | 80 | TA0005, TA0007, T1036 | foo.exe |
| > | ☐ | Thu, Mar 18 2020 | Threat – RR – System Owner/User discovery | 65 | TA0005, TA0007, T1036 | foo.exe,raw-shL + 2 |
| > | ☐ | Thu, Mar 18 2020 | Threat – RR – Remotely Query Login Sessions | 70 | TA0005, TA0007, T1036 | foo.exe, proldent... |
| > | ☐ | Thu, Mar 18 2020 | Threat – RR – System Network Connections discovery | 50 | TA0005, TA0007, T1036 | foo.exeoccaacatC... |
| > | ☐ | Thu, Mar 18 2020 | Threat – RR – Masquerading – Renamed Binary | 55 | TA0005, TA0007, T1036 | proldent.exe, foo.exe |
| > | ☐ | Thu, Mar 18 2020 | Threat – RR – System Network Configuration discovery | 55 | TA0005, TA0007, T1036 | readme.txt, foo.exe |
| > | ☐ | Thu, Mar 18 2020 | Threat – RR – Masquerading – Renamed Binary | 45 | TA0005, TA0007, T1036 | raw-shield.tst, fo... + 2 |
| > | ☐ | Thu, Mar 18 2020 | Threat – RR – Permission Groups discovery | 35 | TA0005, TA0007, T1036 | foo.exe |
| > | ☐ | Thu, Mar 18 2020 | Threat – RR – System Network Connections discovery | 30 | TA0005, TA0007, T1036 | foo.exe |

FIG. 14

GRAPHICAL USER INTERFACE FOR PRESENTATION OF NETWORK SECURITY RISK AND THREAT INFORMATION

CROSS-REFERENCE TO RELATED APPLICATIONS

This application is a continuation of U.S. patent application Ser. No. 17/515,328, filed Oct. 29, 2021, the entire contents of which are hereby incorporated by reference herein.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 5A, 5B, and 5C schematically illustrates an example of a graphical user interface (GUI) for defining risk objects and specifying rules for assigning or modifying risk scores.

FIG. 7 is a depiction of two events enriched with metadata from correlation searches.

FIG. 8A is a depiction of search results of a risk-based analysis making use of correlation searches.

FIG. 11A illustrates an example of an Incidents Review GUI screen.

FIG. 11B illustrates another example of an Incidents Review GUI screen.

FIG. 14 shows an example of a details modal displayed over the timeline graph in a Timeline View GUI screen.

DETAILED DESCRIPTION

Figure 2:
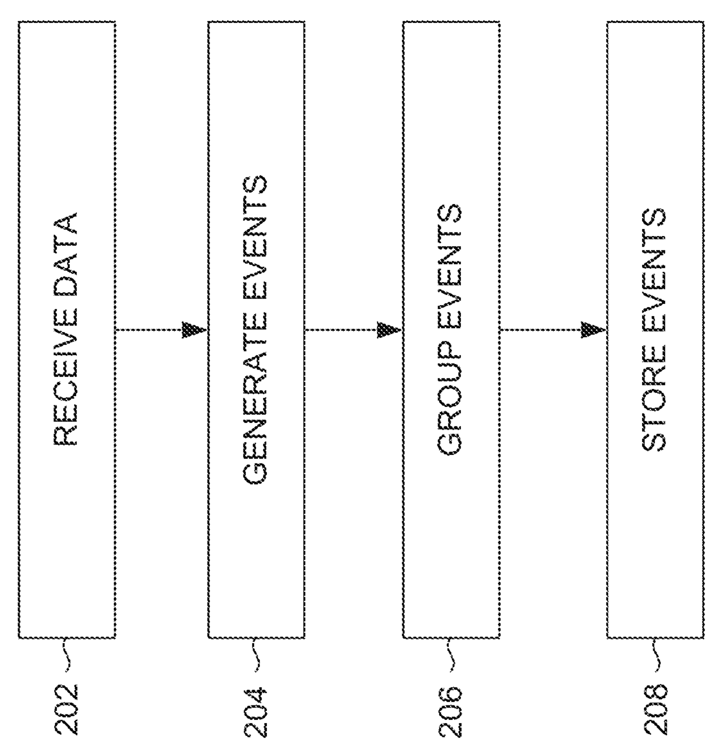
FIG. 2 is a flow diagram illustrating an embodiment of a routine implemented by the data intake and query system to process, index, and store data.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

Figure 1:
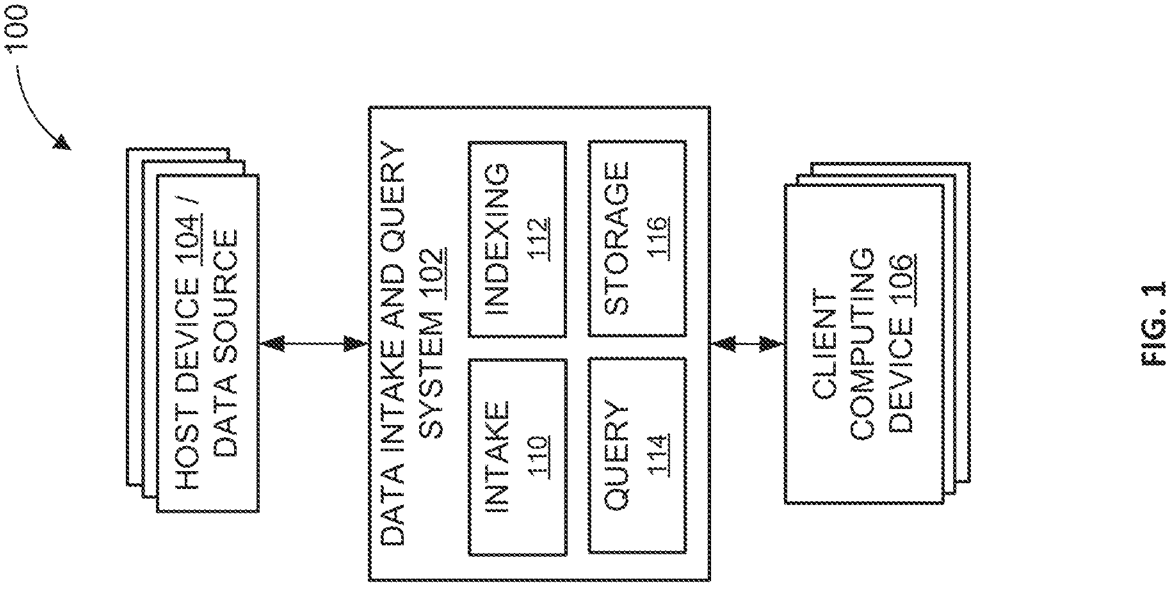
FIG. 1 is a block diagram of an embodiment of a data processing environment.

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

1.1. Client Devices

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

1.2. Host Devices

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time (s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data. Examples of functionality that enables monitoring performance of a host device are described in U.S. patent application Ser. No. 14/524,748, entitled "UTILIZING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

1.3. Data Intake and Query System Overview

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

1.3.1. Intake System Overview

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.3.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

1.3.3. Query System Overview

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

1.3.4. Storage System Overview

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

1.3.5. Other Components of the Data Intake and Query System

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

1.3.6. On-Premise and Shared Computing Resource Environments

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3B:
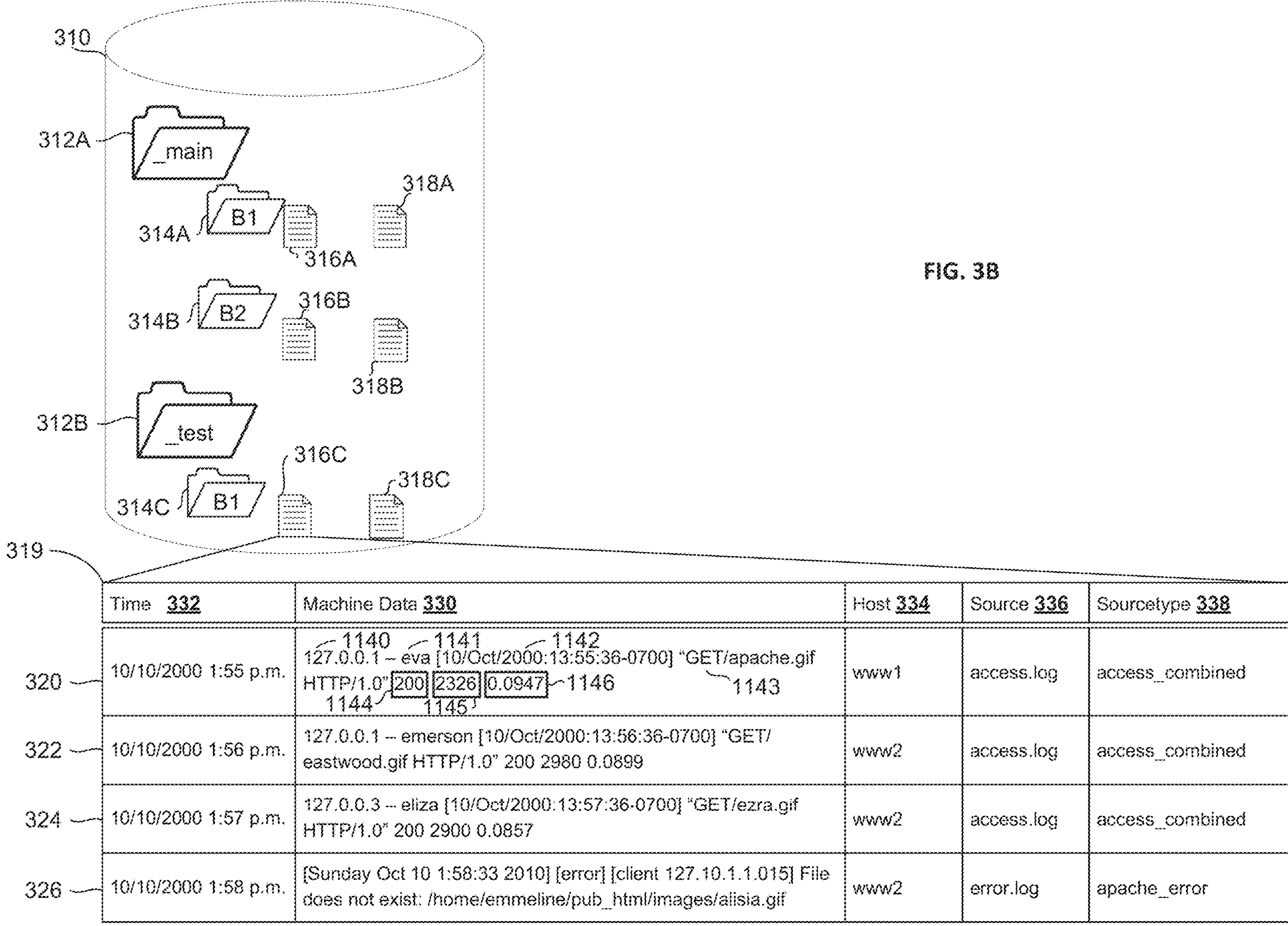
FIGS. 3B and 3C are block diagrams illustrating embodiments of various data structures for storing data processed by the data intake and query system.
Figure 3C:
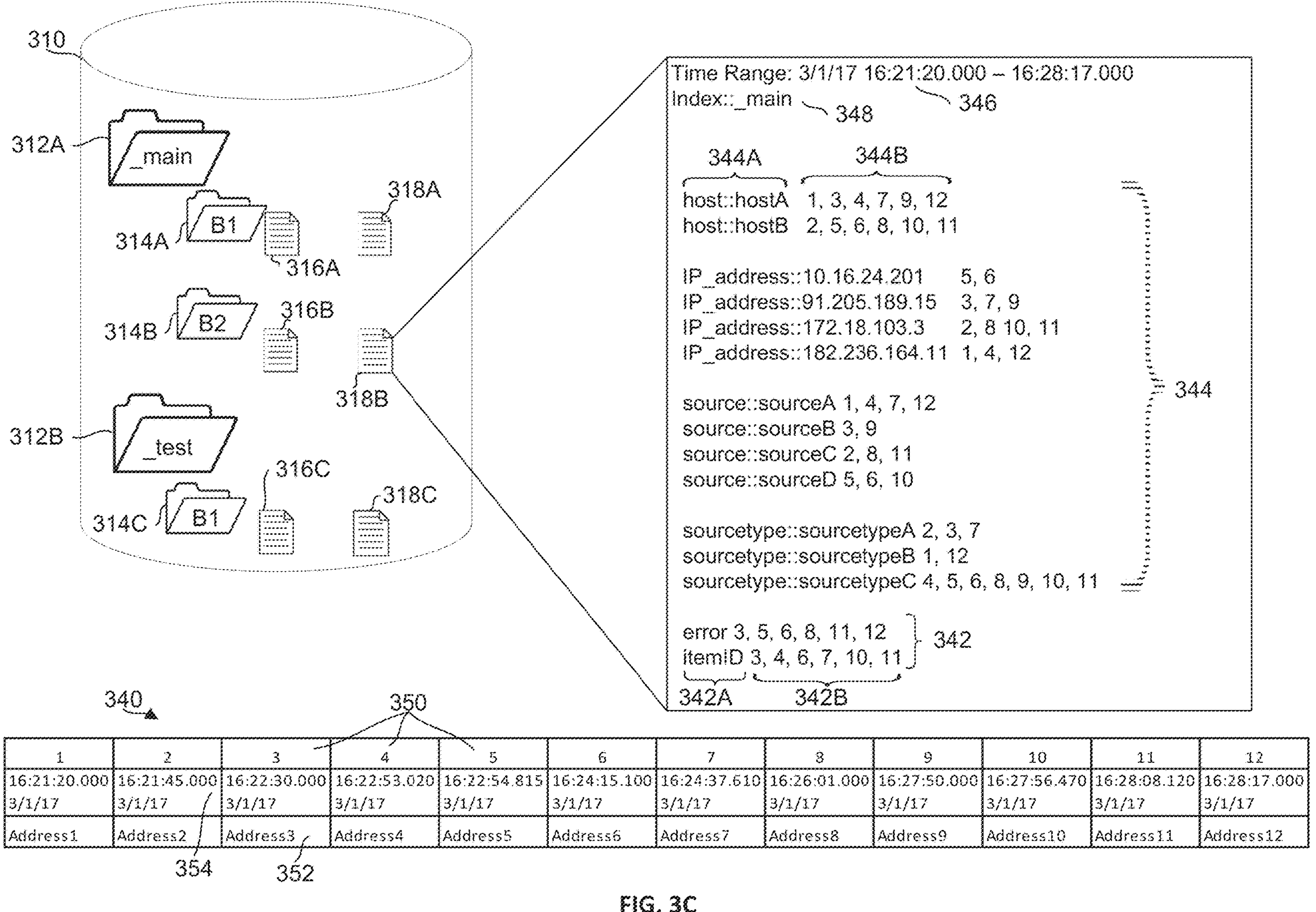

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

2.1. Machine Data and Data Storage Examples

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name: kube-apiserver, host: ip 172 20 43 173.cc2.internal, pod_id: 0a73017b-4cfa-11c8-a4c1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "main" and a _test directory 312B associated with an index "test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "main," the files stored in the sub-directory 314B can correspond to or be associated with bucket "B2" of index "main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries. U.S. application Ser. No. ________, incorporated herein by reference for all purposes, includes a non-limiting example of how the inverted indexes 318 can be used during a data categorization request command. Additional information is disclosed in U.S. application Ser. No. ________ and U.S. Pat. No. 8,589,403, entitled "COMPRESSED JOURNALING IN EVENT TRACKING FILES FOR METADATA RECOVERY AND REPLICATION," issued on 19 Nov. 2013; U.S. Pat. No. 8,412,696, entitled "REAL TIME SEARCHING AND REPORTING," issued on 2 Apr. 2011; U.S. Pat. Nos. 8,589,375 and 8,589,432, both also entitled "REAL TIME SEARCHING AND REPORTING," both issued on 19 Nov. 2013; U.S. Pat. No. 8,682,925, entitled "DISTRIBUTED HIGH PERFORMANCE ANALYTICS STORE," issued on 25 Mar. 2014; U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY," issued on 8 Sep. 2015; and U.S. Pat. No. 9,990,386, entitled "GENERATING AND STORING SUMMARIZATION TABLES FOR SETS OF SEARCHABLE EVENTS," issued on 5 Jun. 2018; each of which is hereby incorporated by reference in its entirety for all purposes, also include additional information regarding the creation and use of different embodiments of inverted indexes, including, but not limited to keyword indexes, high performance indexes and analytics stores, etc.

3.0. Query Processing and Execution

Figure 4A:
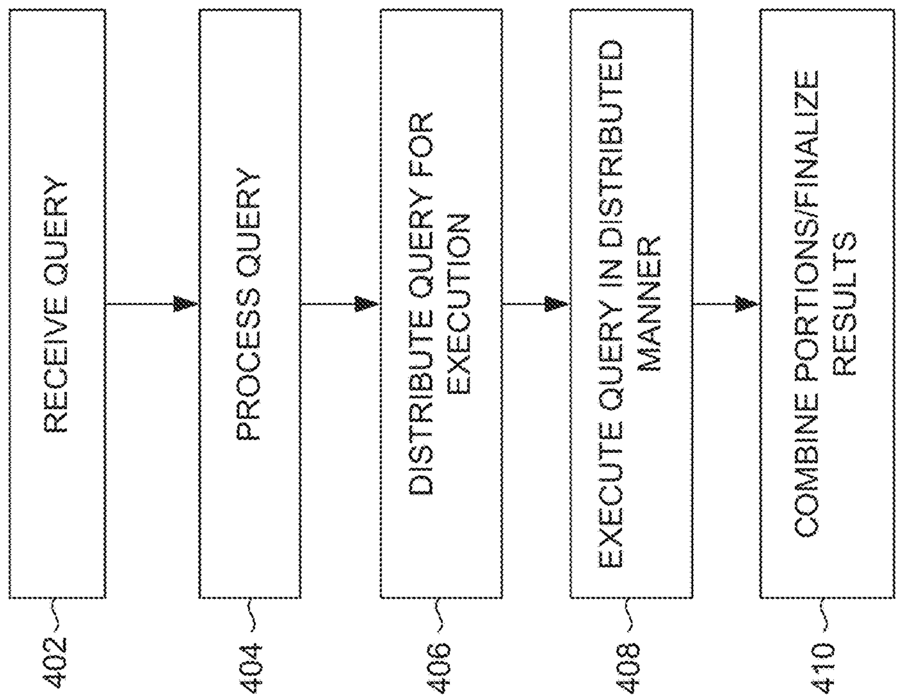
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 114 distributes the determined portions or phases of the query to the appropriate components (e.g., search nodes). In some cases, the query system 114 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

3.1. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
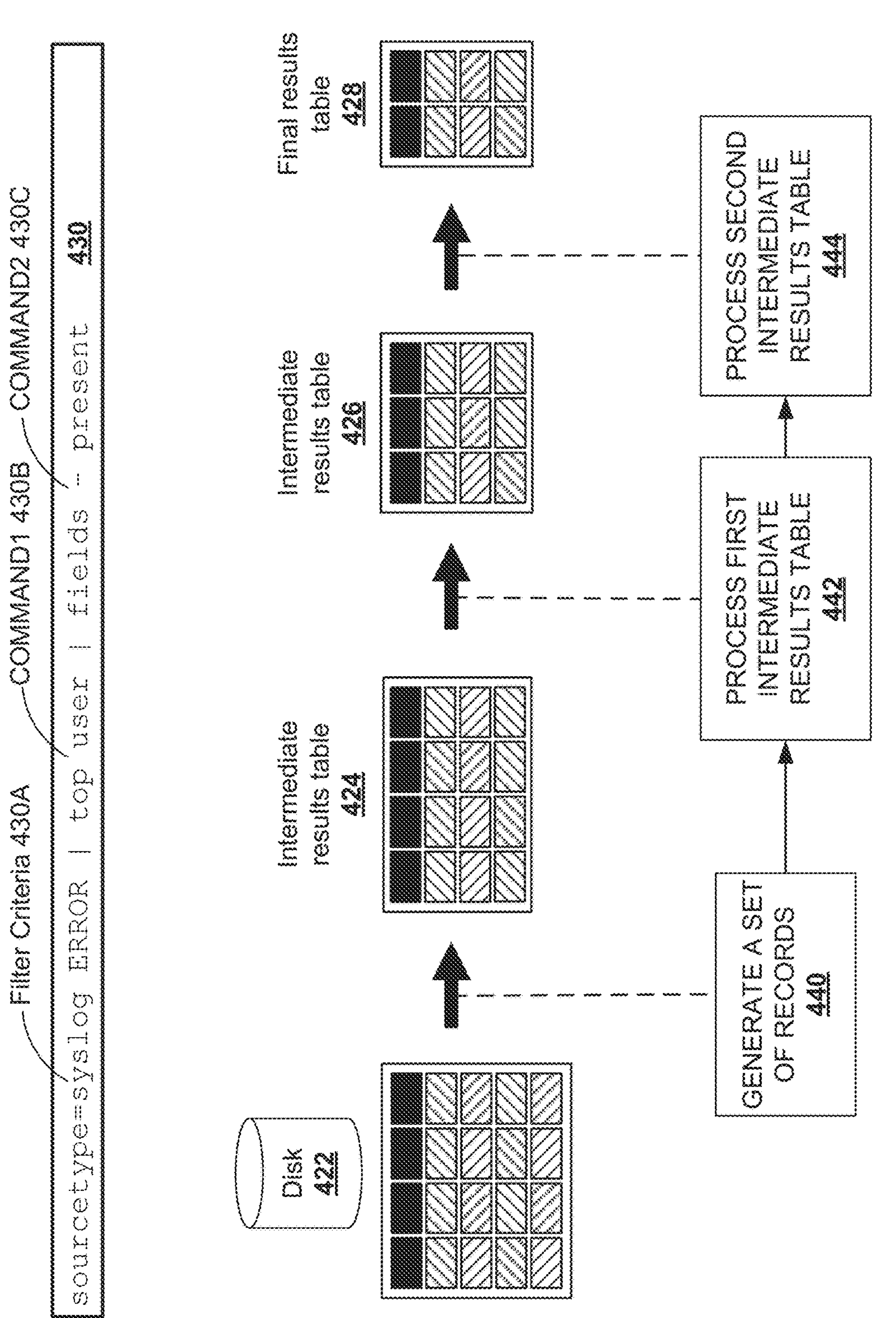
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," "percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

3.2. Field Extraction

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
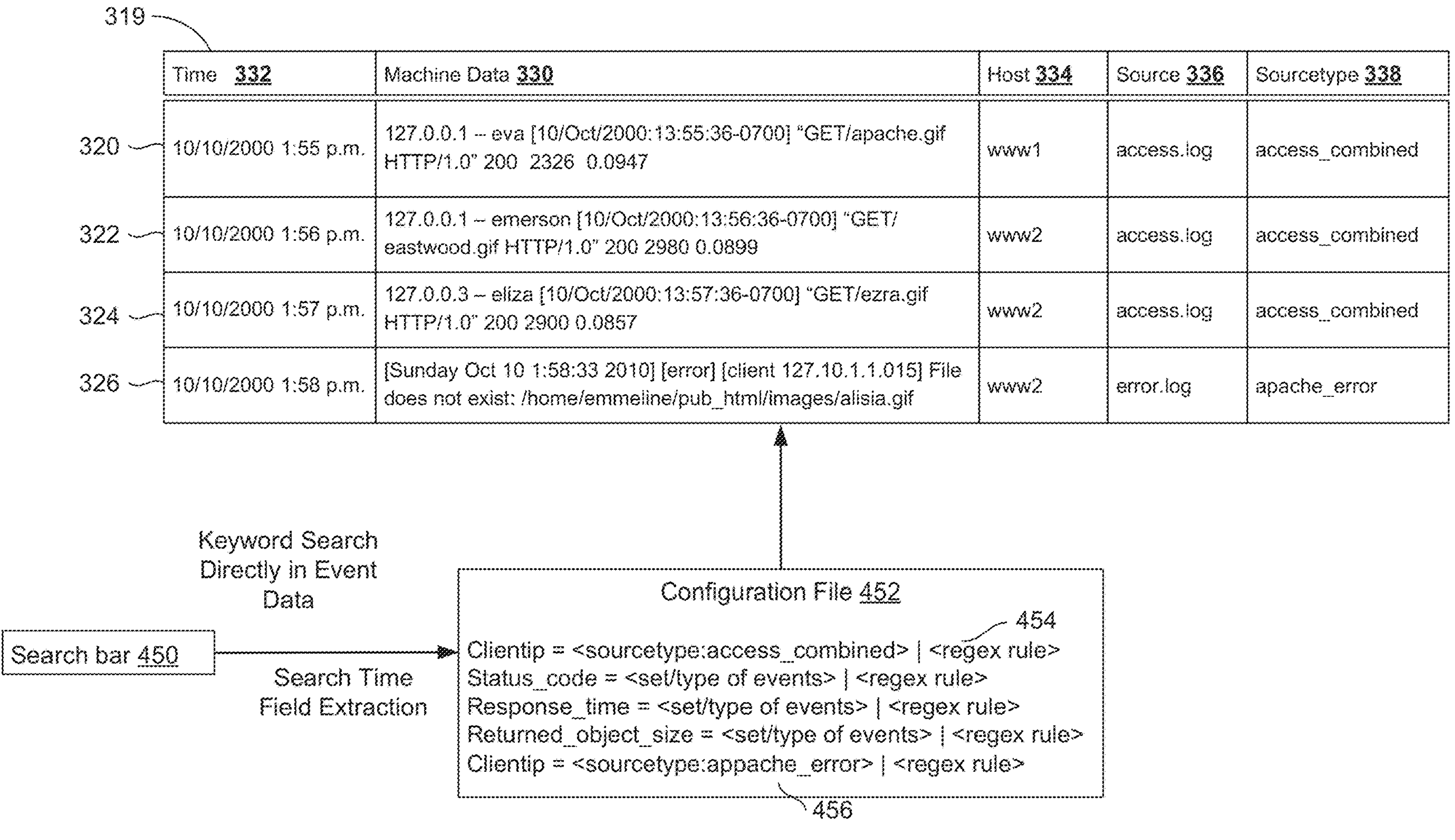
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query includes fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

3.3. Data Models

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports. Additional information regarding data models, their creation and their use is described in U.S. application Ser. No. _________; U.S. Pat. Nos. 8,788,525 and 8,788,526, both entitled "DATA MODEL FOR MACHINE DATA FOR SEMANTIC SEARCH," both issued on 22 Jul. 2014; U.S. Pat. No. 8,983,994, entitled "GENERATION OF A DATA MODEL FOR SEARCHING MACHINE DATA," issued on 17 Mar. 2015; U.S. Pat. No. 9,128,980, entitled "GENERATION OF A DATA MODEL APPLIED TO QUERIES," issued on 8 Sep. 2015; U.S. Pat. No. 9,589,012, entitled "GENERATION OF A DATA MODEL APPLIED TO OBJECT QUERIES," issued on 7 Mar. 2017; each of which is hereby incorporated by reference in its entirety for all purposes. Building reports using a report generation interface is further explained in U.S. patent application Ser. No. 14/503,335, entitled "GENERATING REPORTS FROM UNSTRUCTURED DATA," filed on 30 Sep. 2014, and which is hereby incorporated by reference in its entirety for all purposes.

3.4. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports. Additional acceleration techniques are described in U.S. application Ser. No. _________, which is incorporated by reference herein for all purposes.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

4.1. Security Features

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

Additional information related to various security applications is described in U.S. application Ser. No. 16/512,899; U.S. Pat. No. 8,826,434, entitled "SECURITY THREAT DETECTION BASED ON INDICATIONS IN BIG DATA OF ACCESS TO NEWLY REGISTERED DOMAINS," issued on 2 Sep. 2014; U.S. Pat. No. 9,215,240, entitled "INVESTIGATIVE AND DYNAMIC DETECTION OF POTENTIAL SECURITY-THREAT INDICATORS FROM EVENTS IN BIG DATA," issued on 15 Dec. 2015; U.S. Pat. No. 9,173,801, entitled "GRAPHIC DISPLAY OF SECURITY THREATS BASED ON INDICATIONS OF ACCESS TO NEWLY REGISTERED DOMAINS," issued on 3 Nov. 2015; U.S. Pat. No. 9,248,068, entitled "SECURITY THREAT DETECTION OF NEWLY REGISTERED DOMAINS," issued on 2 Feb. 2016; U.S. Pat. No. 9,426,172, entitled "SECURITY THREAT DETECTION USING DOMAIN NAME ACCESSES," issued on 23 Aug. 2016; U.S. Pat. No. 9,432,396, entitled "SECURITY THREAT DETECTION USING DOMAIN NAME REGISTRATIONS," issued on 30 Aug. 2016; and U.S. App. Pub. No. 2013/0318236, entitled "KEY INDICATORS VIEW," filed on 31 Jul. 2013; each of which is hereby incorporated by reference in its entirety for all purposes.

4.2. IT Service Monitoring

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.3. Client or Customer Insights

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
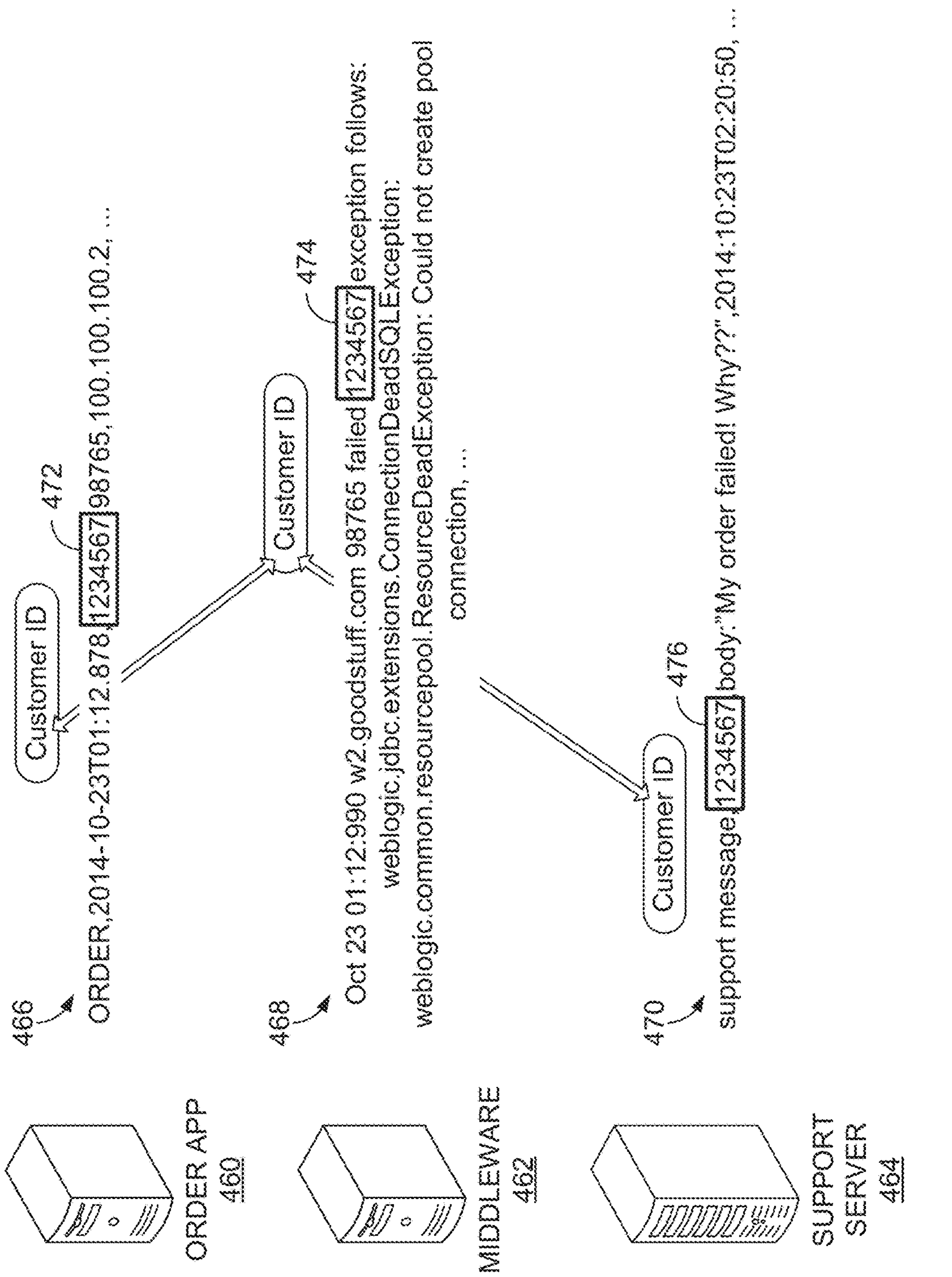
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Identification of Threat Objects for Cybersecurity

Cybersecurity can involve the detection and prevention of malicious activity on a computer network. Cybersecurity tools can perform operations such as malware detection, intrusion detection, detection of unauthorized access or use of data and user accounts, and other related functions. A key focus of cybersecurity is the accurate and timely identification of threats to a computer network. The identification of a threat may be based on the detection of notable behavior by any entity on or associated with the network. In this context an "entity" may be, for example, a user, a device (physical or virtual), cloud service, or a software application. A single notable event is not necessarily indicative of a threat, although it could be. Multiple notable events associated with a given entity may be more likely to indicate a threat, though not necessarily.

Various types of information can be evaluated to determine whether activity is notable, and to decide whether a particular one or more notable events (also called simply "notables") are indicative of a threat. To determine what constitutes a threat, a cybersecurity system may use some form of scoring system to quantify the level of risk associated with an entity or network activity. This approach is known as "risk scoring." A risk scoring system can indicate a security risk associated with a particular entity, but may not indicate the nature of the risk, activities that elevated the risk score, or other entities and their activities that may be related to the risk-inducing activities of the particular entity.

Described herein is a technique of data reduction and focusing for "Entity" and network security. The system can generate events that pertain to specific risk objects, where a risk object is a network device, application, cloud service, or user that generated an associated event. The system also identifies threat objects, where, in at least some embodiments, a threat object is an indicator of a network security threat, and more specifically, is anything that is used, received, interacted with, or acted upon by a risk object. Examples of threat objects might include an executing process, a script, a received email, a file, a hash, a command, an IP address, a network port, or a machine on which the risk object was not expected. Threat objects can be identified using user-specified rules, and once identified, are persisted in metadata that is added by the system to the event data to which the threat objects pertain. Once identified, a threat object is automatically linked by the system to the risk object or objects to which it pertains. The link between a risk object and a threat object is established by using searchable metadata. Through such linking, relationships are identified/established by the system between threat objects and risk objects. The relationships can be embodied by metadata field-value pairs added to the events. Once the relationships have been identified, a visualization process can display them graphically to a user (i.e., to a security analyst).

In at least some embodiments, the relationships between risk objects and threat objects are indicated to a user (e.g., a network security administrator) based on satisfaction of predetermined thresholds. Excessive amounts of data produced by searches for notable activity can be reduced to a manageable number of notices by limiting alerts (via searches or reports) to those having relationships between threat objects and risk objects that are of a predetermined character. Metadata, such as risk object identification, is searchable using graphical user interface (GUI) features.

As noted above, the technique introduced here identifies (among other things) two types of objects: risk objects and threat objects. The technique involves event data as collected from the relevant system or network. During a first search, the cybersecurity system examines the event data to identify notable events and stores that event data. The first search makes use of user-specified correlation rules to identify events considered "notable" because events that match the correlation rules are of interest to an analyst. The first search can further associate risk objects and threat objects with notable events and can enrich the event data with these associations. A search of the enriched data can identify relationships between threat objects and risk objects having a predetermined character, such as particular thresholds. The cybersecurity system can then indicate those relationships to a user. A visualization process accesses the data describing the relationships to display the data to a user.

FIGS. 5A, B, and C schematically illustrate an example of a GUI for defining a correlation search and specifying rules for assigning or modifying risk scores assigned to events found by the search. FIGS. 5A through 5C consecutively illustrate a single interface broken into three parts for convenience of view. "Correlation" searches are referred to as such because frequently (though not always) these searches are configured to find events that have certain relationships between the fields of the events. For example, a correlation search can be configured to search for events indicating an email received with an image attachment. As another example, a correlation search can be configured to search for events indicating network traffic received from a particular IP address, where the quantity of the network traffic exceeds a threshold amount. While FIGS. 5A-C and the corresponding description illustrate and refer to security risk scores, the same and/or similar GUI elements, systems and methods may be utilized to specify information for assigning other types of scores, such as system performance scores or application performance scores, among other examples.

As schematically illustrated by FIG. 5A, the depicted GUI 500 includes fields for specifying information about the correlation search, such as an alphanumeric name field 507, in which a user can specify a name for the search, and an alphanumeric description field 510, in which the user can enter text describing the search, stating a purpose for the search, or other informative information about the search. In some embodiments, the depicted GUI 500 further includes a drop-down list for selecting the application context 515 associated with the search. In an illustrative example, the application context may identify an application of a certain platform, such as the SPLUNK® ENTERPRISE system produced by Splunk Inc. of San Francisco, California, which is described in more details herein).

In certain implementations, the depicted GUI 500 may further comprise a text box 520 for specifying a search query string for the correlation search. Each result returned from executing the search query string is an event, which may be referred to as a "notable event" to distinguish events found by correlation searches from other events. The search query string comprises one or more search terms specifying the search criteria. As an illustrative example, the search query string uses the syntax of a certain query language supported by the data intake and query system 102, such as Splunk Search Processing Language (SPL). The search query enables implementation of correlation rule-based searches. Correlation-rule based searches seek predefined patterns in machine data embodied in events to identify events considered "notable" to a user. For example, a user can specify correlation searches to identify events indicating failed log in attempts, port scans, or (as illustrated in FIG. 5A-C) activity by a user accounts that have expired. In this and other examples, the events found by these searches be associated with legitimate activity (e.g., legitimate users frequently enter incorrect passwords, and legitimate network maintenance tools conduct port scans) but such activity may also be indicative of threat or attack on the system, and thus the events may be of interest to a network security analyst.

The depicted GUI further includes an annotations region 522 wherein a user may indicate a desired known attack catalog designation to be applied to events as an annotation. In the figure, four different catalogs of known attacks are indicated (e.g., CIS 20, Kill Chain, MITRE ATT&CK, and NIST). The catalogs used in the figure are illustrative and not intended as a closed list of available catalogs.

As schematically illustrated by FIG. 5B, the depicted GUI 500 includes fields for unmanaged annotations 524. The unmanaged annotations 524 are similar to those available in the annotations 522 but employing user defined attacks as opposed to those found in known catalogs.

The depicted GUI 500 includes other fields, including start time and end time input fields 525A-525B. In an illustrative example, the start time and end time define a time window specified relative to the current time (e.g., from 5 minutes before the current time to the current time). The start time and end time input fields limit the scope of the search to a specified the time range. Searches are then performed on the source data items (e.g., events) that have timestamps falling within the specified time range. Further included are scheduling controls 532. The scheduling controls 532 control a frequency of executing a given configured search and the order in which that search is executed as compared to others. Trigger conditions controls 534 configure how frequently a given set of search results are reported to a user and under which conditions.

The depicted GUI 500C further includes a schedule input field 530 that defines a schedule according to which the search query should be executed by the cybersecurity system. An optional throttling window input field 535 and an optional grouping field selection field 540 define a throttling condition. The throttling condition suppresses, for a certain period of time (e.g., for a number of seconds specified by field 535), a trigger for the score modification and/or other actions associated with the search query. Grouping field 540 is used to select a field by the value of which the search results should be grouped for evaluating the throttling condition. In other words, the cybersecurity system that uses these fields may suppress the actions associated with the search query for a specified number of seconds for the search results that include the same value in the specified field (e.g., the same user identifier in the "user" field shown in the grouping field 540 in the illustrative example of FIG. 5).

The depicted GUI 500 includes a risk scoring feature that can be used to enrich the search results. In the illustrated example, first component of the risk scoring feature is a switch designated, "Create risk score modifier" 545 that specifies that the specified risk score modification actions should be performed events that match the search query. In this example, when the switch is disabled, risk scoring will not be applied to the search results. Risk scores are assigned to risk objects. A "risk object" in this context is any network-associated entity with which a risk level can be associated. Examples include: a user (e.g., a digital entity that can be used by one or more people to access and/or make use of computer devices), a device or item (e.g., a client computer, server, router, employee badge), which may be physical or virtual, or a software application (e.g., a database, a service with permissions or a program containing assets).

The cybersecurity system is configured to adjust, by a certain risk score modifier value, the risk score assigned to a risk object at certain times. In an illustrative example, the risk score associated with a risk object may be modified every time a search query (e.g., the query specified in the text box 520) is executed. Alternatively, the risk score associated with a risk object may be modified when the number of times an event matches the search criteria exceeds a threshold. In yet another example, the risk score associated with a risk object may be modified when the aggregated statistics pertaining to the dataset returned by the search query meets certain criteria (e.g., exceeding a threshold, being under a threshold, or falling within a certain range).

In the illustrative example of FIG. 5, the risk score modifier value is specified by input field 550 as a constant numeric value, such that events that match the correlation search will be assigned a fixed risk score. In other examples, the risk score modifier value is determined by performing certain calculations on data items (referenced by the corresponding fields names) that are identified by the search query as meeting the criteria of the query. For example, the search query string specified in FIG. 5 counts a number of expired activity events for a particular user and sets a base risk score that multiplies this count by 10. In this example, the score for the user is further increased by 80, as indicated by the score input field 550.

The risk object field 555 identifies the risk object whose risk score is modified by the cybersecurity system. The risk object can be identified from a field in the events that match the search query. In the example GUI 500, the risk object is determined for a field called "user." Thus, for example, for an event where the user field is equal to "jdoe" the risk object for the event is set to the string "jdoe." In this example, events that have a different value for the user field will have different risk objects. As another example, a user can specify a field such as "hostname" as the risk object. In this example, an event where the hostname field is equal to "splk-1234" the risk object for the event is set to the string "splk-1234."

The risk object type field 560 identifies the type of risk object specified in the risk object field 555. In various examples, the GUI 500 can enable selection of entities such as "user," "hostname," "IP address," "virtual machine ID," or "application" among other examples. Additionally or alternatively, the GUI 500 can enable a user-defined type (e.g., a building). Additionally, subtypes may be available. For example, a user may be able to specify "source IP address" and "destination IP address" in addition to, or instead of, "IP address.".

Optional response actions 565A-565C specify one or more actions to be performed by the cybersecurity system when the correlation search runs and/or runs and returns results. The actions may include, for example, sending an e-mail message comprising the risk score modifier value and/or at least part of the dataset that has triggered the risk score modification, creating an RSS feed comprising the risk score modifier value and/or at least part of the dataset that has triggered the risk score modification, and/or executing a shell script having at least one parameter defined based on the score. The risk message field 570 adds information to events found by the search query.

The GUI 500 of FIGS. 5A-C illustrates one example method by which a user can define a correlation search that associates risk scores with risk objects. In various examples, other methods can be used, including methods in which a user specifies the information entered in the fields of the GUI 500 in a search query, using a search query language such as SPL.

Figure 6A:
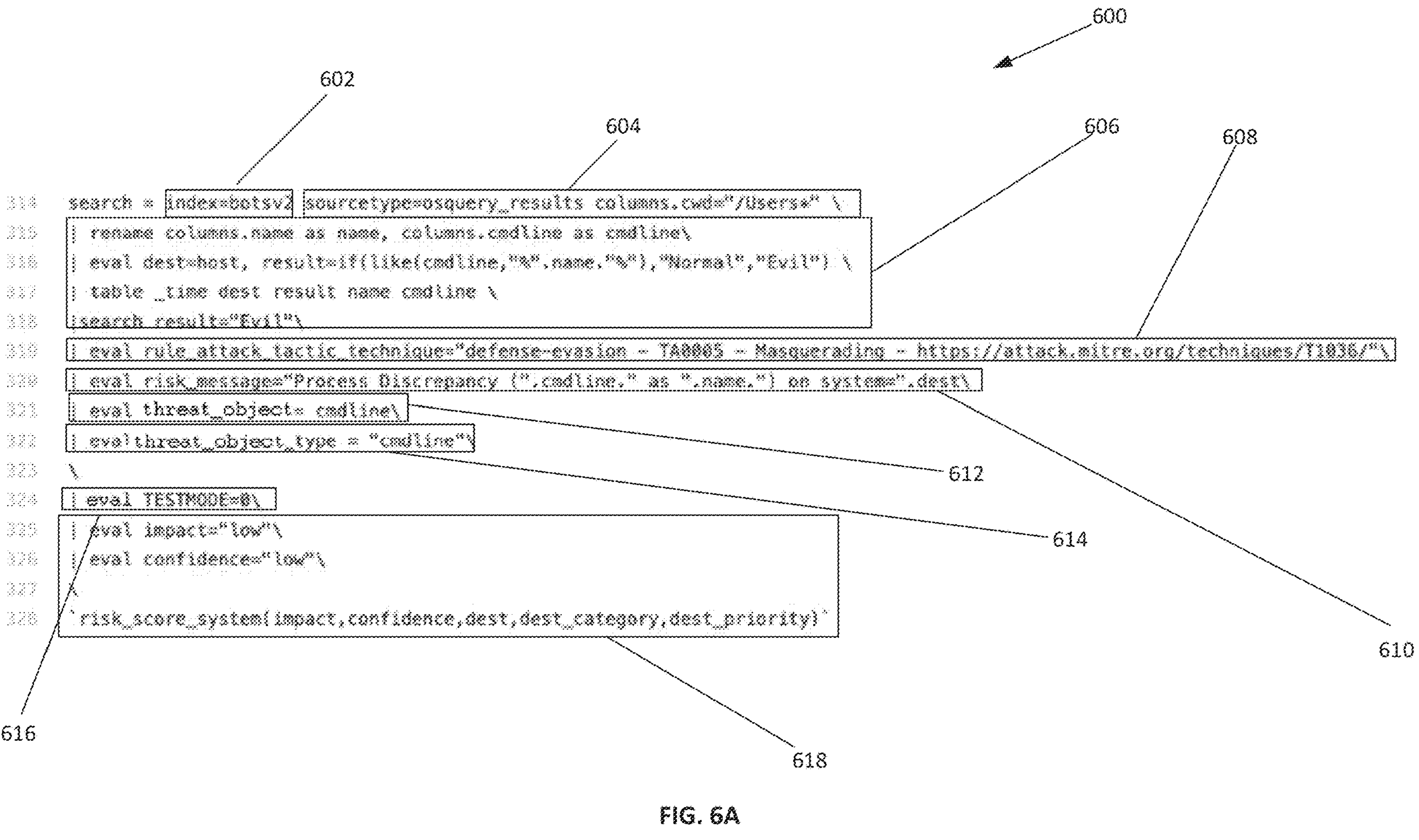
FIG. 6A is a depiction of a search query that when executed carries out a correlation search and enriches the searched data with additional metadata indicative of a threat object and a threat object type.

FIG. 6A is a depiction of a search query 600 that when executed carries out a correlation search and enriches the search results. Enrichment of search results is a process that associates additional data to an existing search result set of events. In particular, the search query 600 associates events found by the search query 600 with a threat object and a threat object type, which can be added to the events as additional metadata. As discussed further below, the threat object metadata can be used to identify associations between a risk object and potentially malicious activity, as well as potentially malicious activity involving multiple risk objects. These relationships can enable a cybersecurity system to reduce massive amounts of notable events to ones most likely associated with security threats, and thereby reduce the number of events that a security analyst needs to review to the most actionable events. In various examples, a cybersecurity system can further assist the security analyst with visualizations of risk objects, threat objects, and relationships between them.

The example search query 600 includes various instructions or commands that have been grouped together into boxes in FIG. 6 for purposes of description. These groupings are for convenience only and are not meant to imply a requirement that the instructions or commands included in a group must appear together. Additionally, various instructions or commands are included for illustrative purposes, and are not required to define a search query.

A first group 602 indicates a location from which to retrieve events on which the search query 600 is performed. The location can be a data store where previously ingested events have been stored.

A second group 604 illustrates an example of search criteria. The search criteria describes the events that are to be obtained by the search query 600. The search criteria can specify, for example, event fields, field values, and/or metadata associated with events, such as a type of the event or a type of the source the produced the event, among other examples.

A third group 606 specifies a set of manipulations to conduct on the search results. Manipulations can include, for example, renaming a field. More particularly, the third code segment 606 includes an instruction to identify events that include the execution of a command line command, and to tag these events with the string "Evil." The group further includes an embedded search command, which is configured to apply the events that were tagged as "Evil" by the manipulation instructions.

A fourth group 608 adds information to events found by the search query 600. In this example, the instructions add a description of potential attack behavior indicative of a known attack profile as described by the MITRE ATT&CK framework. Examples of known MITRE attack profiles include: obtaining access to the network; executing malicious code; maintaining a presence in the network; gaining higher privileges in the network; attempting to avoid detection; stealing network credentials or data; laterally moving through the network; gathering data on a target or network environment; communicating and controlling comprised systems; or destroying or manipulating systems or data. This information can provide an analyst with useful contextual information when analyzing the events found by the search query 600. In various examples, the information can be added to an event as an additional field-value pair.

A fifth group 610 also adds information to events found by the search query 600. In this example, the instructions add a message that includes the command line command that was executed and some other possibly relevant, related information that may be useful to an analyst.

A sixth group 612 and a seventh group 614 add threat object information to events found by the search query 600. A "threat object" is an indicator of a security threat, and more specifically, is anything that is used, received, interacted with or acted upon by a risk object. In some examples, such as in the example search query 600, a threat object may be related to a known attack tactic, such as is defined in the fourth group 608. In these examples, threat object can be considered synonymous with or specifically describing the tactic described by this attack tactic metadata. Examples of threat objects might include an executing process, a script, a received email, a file, a hash, a command, an IP address, a network port, or a machine on which the risk object was not expected, among other examples. The sixth group 612 defines a field called "threat_object" whose value can be a numerical or alphanumerical constant (e.g., text specified in quotes), can be derived from field values in an event identified by the search query 600, or can be derived for other computations or operations performed by the search query 600. The threat object can be added to an event as an additional field-value pair The seventh group 614 specifies an object type (e.g., a class or category) for the threat object, which can aide in understanding the threat object. Example object types for the threat object include: user, executable, file, command, IP address, port number, email address, email, or various device types, among other examples. An eighth group 616 indicates a test mode.

A ninth group 618 causes execution of a "macro," that is, an additional set of instructions that have been set down elsewhere and given an identifier (e.g., "risk_score_system" in the illustrated example) so that the set of instructions can be reused across different searches. In particular, the macro in the night group 618 includes instructions for risk scoring operations to be executed for the events identified by the search query 600. The risk scoring operations can include, for example, identification of a risk object and a risk object type, determination of a risk score, and/or modification of a risk score. These operations can add information to the events in form of additional field-value pairs (e.g., for a risk object field, a risk object type filed, and/or a risk score field). In some examples, multiple risk objects can be associated with the same event, and metadata for these risk objects can be added to event data using additional instruction and/or macros.

Figure 6B:
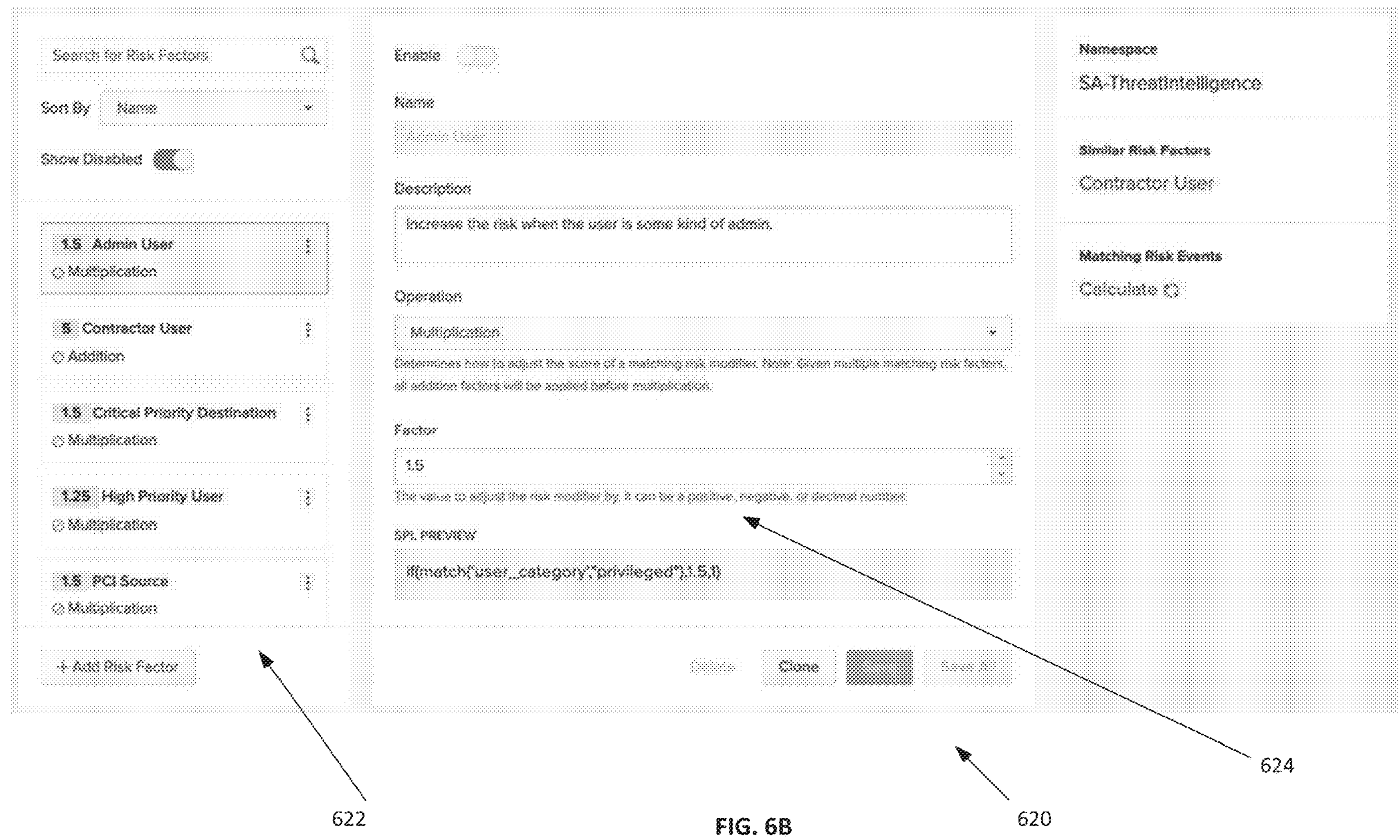
FIG. 6B is a depiction of a user interface for modifying risk score evaluations during a search query as illustrated in FIG. 6A.
Figure 6C:
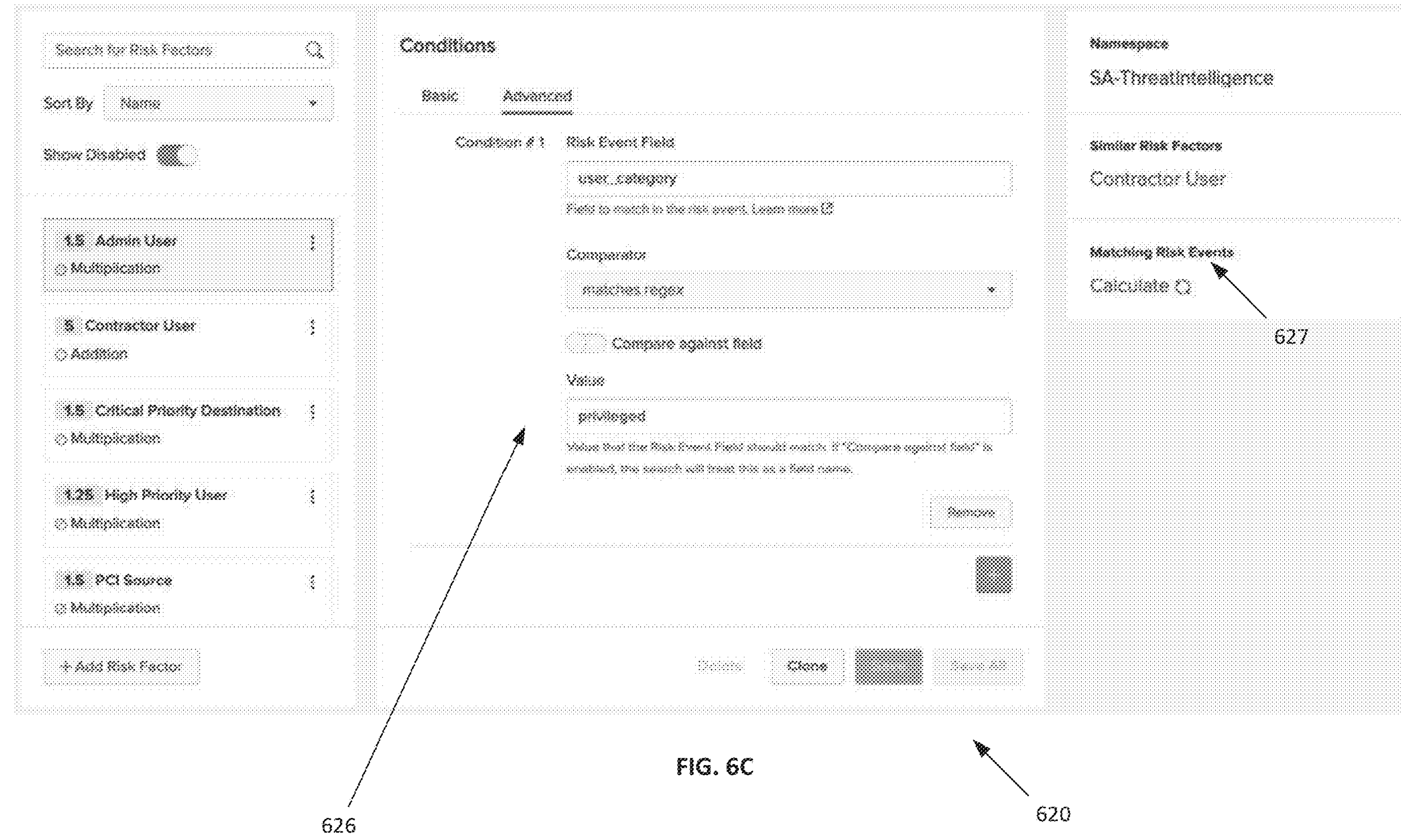
FIG. 6C is a depiction of a user interface for controlling conditions that modify a risk score during a search query as illustrated in FIG. 6A.

FIG. 6B is a depiction of an embodiment of a user interface for modifying risk score evaluations 620 during execution of a search query as illustrated in FIG. 6A. FIG. 6C is a depiction of a user interface for controlling conditions that modify a risk score during a search query as illustrated in FIG. 6A. FIGS. 6B and 6C illustrate a single interface broken into two parts for convenience of view, where a middle section scrolls vertically.

The illustrated embodiment of the interface for modifying risk scores 620 includes a set of condition related modifications 622. Each condition is applied using inclusive OR logic when enabled and causes the risk score of a given event to be modified by an indicated amount via either addition or multiplication. A first portion of the interface 624 enables a user to modify a given condition. A second portion of the interface 626 enables a user to enable or disable the conditions. The risk modification of search results may be based on a number of conditions, for example, the user or machine the events pertain to. Based on activated settings, users or machines that have access to or store more sensitive data are associated with higher risk scores.

FIG. 7 is a depiction of two example events identified by a correlation search, enriched by the correlation search with metadata that can be used for threat object identification and analysis. In particular, each event includes a "threat_object" field, a "threat_object_type" field, a "risk_object" field, and a "risk_object_type" field, which have been added to each event by the correlation search in a manner such as is describe above with respect to FIG. 6. The Matching Risk Events portion 627 of the GUI provides the user with the ability to test, model, or understand the effect of a given risk factor prior to enabling.

In the example of FIG. 7, the first event is associated with a risk object of type 708 of "system" having a particular location (indicated by the risk object field 702A). The first event is further associated with a threat object type 706 of "IP" having a particular address (indicated by the threat object field 704). The second event is also associated with a risk object type 708 of "system," but in this case the risk object field 702*b* indicates a different system was involved than for the first event. Additionally, the second event is associated with the same threat object, as indicated by the threat object field 706 and threat object type 706 The effect of the specific relationship between the risk objects and threat objects included in FIG. 7 is described further below with reference to FIG. 8B.

6.0. Analysis of Linked Threat Objects and Risk Objects

In various examples, events identified by correlation searches such as are described above can be further analyzed to identify, from a potentially enormous number of notable events, risk objects that may be associated with an actual security threat. In a system that uses this type of analysis, which can be referred to as risk-based analysis, a notable event need not be brought to the attention of a security analyst unless the notable event is associated with a risk object that has exhibited certain risky behavior. Risk-based analysis of notable events can thus significantly reduce the number of alerts raised for an analyst's attention and can focus the analyst's time on alerts that may require actual action. Risk-based analysis can thus enable a cybersecurity system to be more effective in identifying actionable threats.

Risk based analysis can include searching notable events using a search query specified in a syntax such as is provided by SPL. This search query may be referred to herein as a rule-based search. The notable events, obtained using correlation searches as described above, may have been stored by the correlation searches in a searchable index or database. The events in the index or database can further have been enriched by the correlation search by the addition of attack tactic information, risk object information, and/or threat object information to each event.

A search query for risk-based analysis can perform operations relative to the risk objects and/or risk object types identified by the correlation searches, and determine characteristics, such as statistics, for the risk objects and/or risk object types. For example, the search query can include instructions or commands to sum risk scores associated with the risk objects and/or risk object types, determine the number of correlation rules that found events associated with the risk objects and/or risk object types, and/or accumulate (e.g. by counting) the number of attack tactics (represented in the events by attack tactic fields and/or threat object fields) associated with the risk objects and/or risk object types. The results from each of these commands can be used as a factor in identifying risk objects that need to be brought to an analyst's attention. More specifically, risk objects or risk object types whose statistics meet tunable thresholds, particularly with respect to the number of attack tactics, can be identified by the search query as the risk objects and risk object behavior that needs to be looked at by an analyst. For example, a search query can identify risk objects that are each associated with three (or another suitable number) or more attack tactics, and can surface these risk objects for analyst review. In some examples, the search query can include additional qualifiers, such as a risk score threshold and/or a time period during which the events associated with the attack tactics had to have occurred, among other examples.

A technique called link analysis can be applied to the search results to identify links between threat objects and risk objects. Through linking, relationships are built between threat objects and risk objects. Any number (N) of risk objects can be linked to any number (M) of threat objects. Each of N and M can be a user-specified number greater than or equal to one. A given risk object may have multiple threat objects linked to it. Multiple risk objects may each have an instance of the same threat object linked to them. In some embodiments, relationships that tend toward extremes (e.g., with a significant disparity between values for N and M) are indicative of an attack or malicious activity on the subject network. What constitutes as a "significant disparity" varies between systems or networks and may be tuned with respect to baseline and variance models. The relationships are indicated (e.g., displayed) to a user based on satisfaction of predetermined thresholds. Examples of display to the user may include generation of a threat report, anomaly alerts, or graphical presentations depicting the links in the relationship(s).

A cybersecurity system can output the results of a risk-based analysis search query, for example using a GUI. The GUI can display the results, for example, in a tabular format that includes the risk object or risk object type and the reason why the risk object or object type has been included in the table (e.g., the risk object or risk object type's statistics). FIG. 8A is a depiction of search results of a risk-based analysis that makes use of correlation searches. Each of the results includes a timestamp 802, an associated risk object 804, a risk score 806, and a title 808 describing what caused the search result to appear before the analyst. Each result depicted relates to one or more events. The first result pertains to risk object wrk-btun.frothy.local (the device assigned to user Billy "btun" Tun), which has a high risk score. The high risk score is explained by the text in the title. Specifically, a series of events associated with the btun device exceeded predetermined thresholds by including threat objects representing 5 risk rules, 5 malicious tactics, and 11 malicious techniques. The first search result indicates a relationship between risk objects and threat objects similar to that visualized by FIG. 9A.

Notably, a number of other search results refer to the same risk object (Billy Tun's device) while other search results refer to the related risk object, billy.tun (the user profile associated with Billy Tun). An analyst observing the depicted search results would rightly conclude that numerous contact points on the network for Billy Tun have been compromised.

Figure 8B:
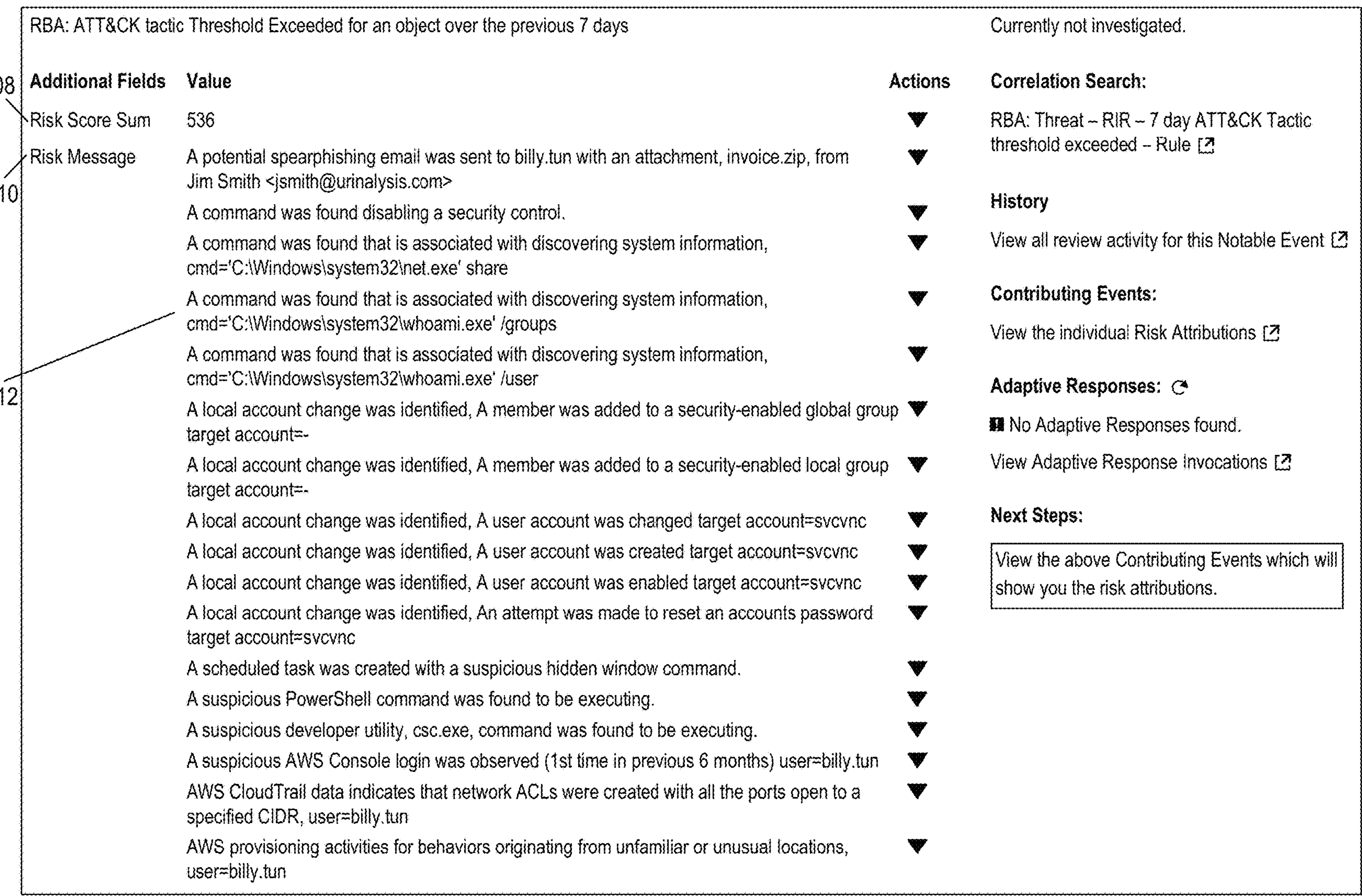
FIG. 8B is a depiction of an expansion of a given row of the table of FIG. 8A so that detailed information about a risk object or risk object type can be displayed.

FIG. 8B is a depiction of an expansion of a given row of the table so that detailed information about a risk object or risk object type can be displayed. The detailed information can include, for example, a total risk score 808 for the risk object or risk object type, each attack tactic (e.g. in the form of a threat object) that is associated with the risk object or risk object type, a risk message 810 including a description associated with each attack 812 tactic, and/or any available attack tactic framework information, among other examples. The table can further include elements that enable a user to find more information about the events associated with the risk object or risk object type and/or to take actions with respect to the risk object or risk object type.

Outputting the results from a risk-based analysis search query can highlight to an analyst the behavior of particular risk objects. In various examples, the search results can further be used to determine whether the threat objects (identified above as attack tactics) associated with one risk object are also are associated with other risk objects. These other risk objects might be suffering a similar attack, or might be components in a larger attack campaign.

Figure 9A:
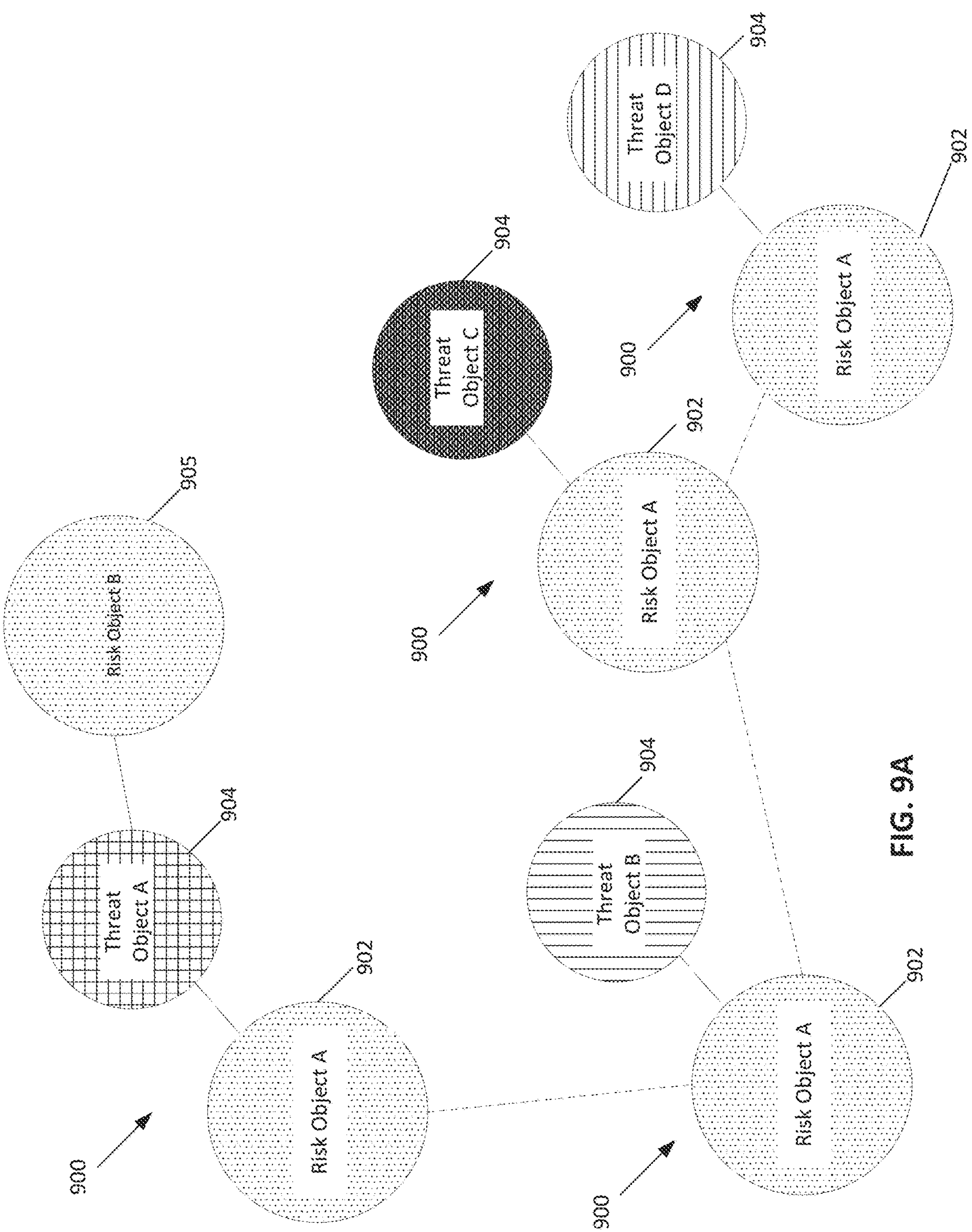
FIG. 9A is an illustration of a given risk object linked to multiple threat objects.

FIG. 9A is an illustration of a given risk object linked to multiple threat objects and is an example of a GUI display. In the example of FIG. 9A, all of the risk objects 902 are the same (e.g., referring to a single machine or single user), and multiple risk objects are depicted to illustrate multiple notable events 900, each associated with or identifying a different threat object 902. Here, four threat objects 904 are linked to a single risk object 902. The depicted relationship in terms of N and M is 1:4, respectively. Notably, this relationship example depicts a disparity between the number of threat objects and risk objects. Whether the depicted relationship is a significant disparity is, as noted above, a matter determined on a per-system or per-network basis. Relationships or links between one threat object and different risk objects can also be depicted using a node graph.

Additionally, after identifying the threat objects associated with a given risk object, the system may do a deeper analysis (e.g., via a recursive search) to identify and display any other risk objects associated with the identified threat objects. For example, FIG. 9A shows another risk object 905 that has been identified as being associated with the threat object 904.

Figure 9B:
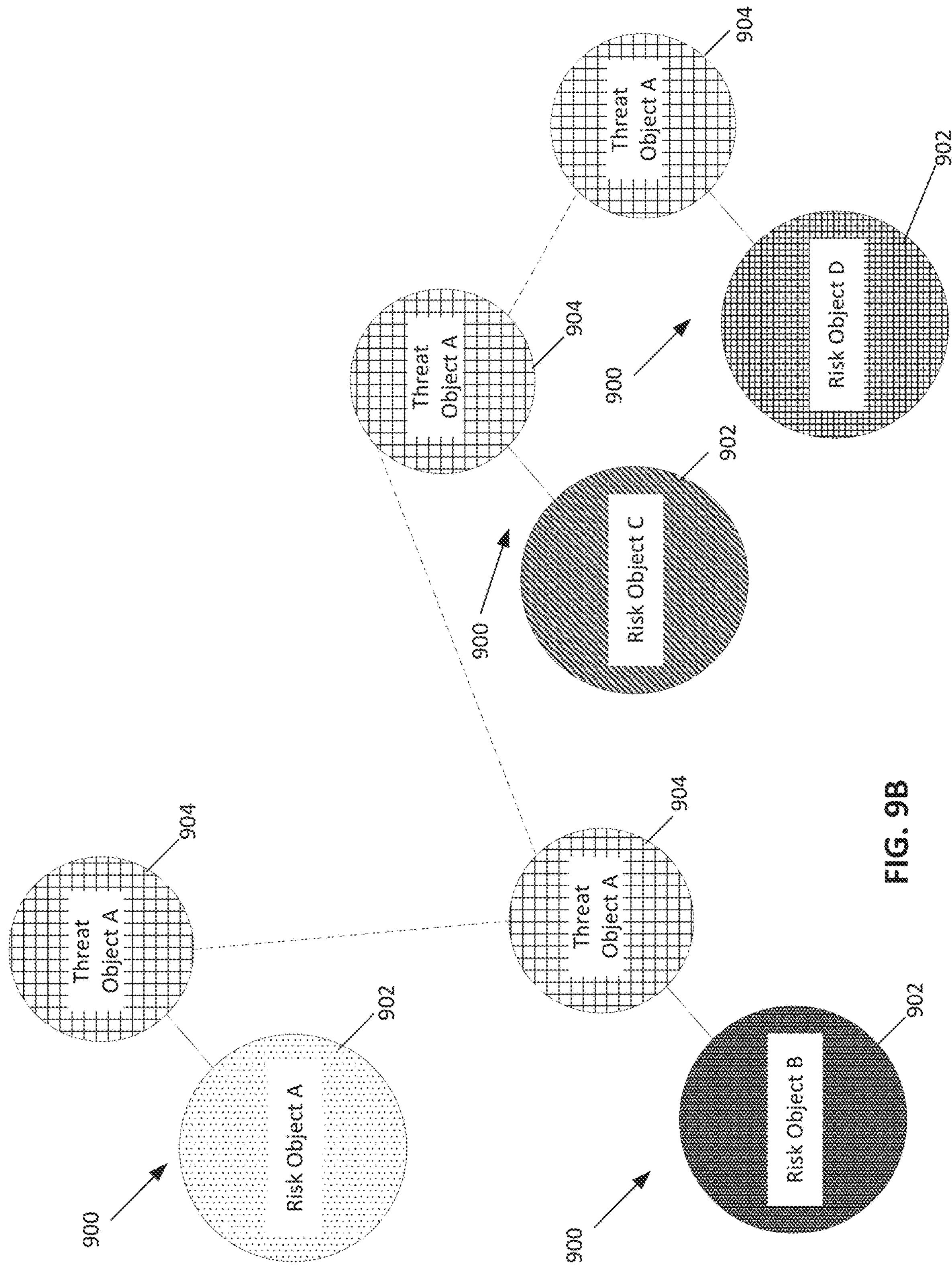
FIG. 9B is an illustration of a number of instances of a given threat object linked to multiple risk objects.

FIG. 9B is an illustration of a number of instances of a given threat object linked to multiple risk objects and is an example of a GUI display. In the example of FIG. 9B, all of the risk objects 902 are different (e.g., referring to different machines or users), while all of the threat objects 904 depicted are the same. Because threat objects 904 may be processes or executables run on various device or by various users, the depicted threat objects 904 are not necessarily identical but are instances of the same threat object and may be identified, at least informally, as the same.

In the depicted circumstance, where multiple, different risk objects 902 are linked to a given threat object 902, there is an indication that a similar attack tactic is being attempted on numerous members of the network (e.g., a single malicious actor is attempting an attack). Based on the type and breadth of attack, the depicted relationship is an indicator of compromise. Whether the breadth of application of a threat object 904 constitutes an indicator of compromise can be tuned to a given network or system and detected through predetermined thresholds and/or analyst determination.

In the illustrated example, four risk objects are linked to instances of a single threat object. The depicted relationship in terms of N and M is 4:1, respectively. Notably, this relationship example depicts a disparity between the number of threat objects 904 and risk objects 902. Whether the depicted relationship is a significant disparity is, again, a matter determined on a per-system or per-network basis.

In various examples, the graphs such as are illustrated in FIGS. 9A and 9B can be combined to provide a larger picture of events that are possibly related to one or multiple attacks on a system. For example, a user may begin with a graph of the threat objects related to one risk object, and then further explore a particular threat object by instructing the interface to display other risk objects that are related to the threat object. By expanding the graph to include more linkages, the user may be able to gain a fuller picture of the threat or threats to the system.

Figure 10:
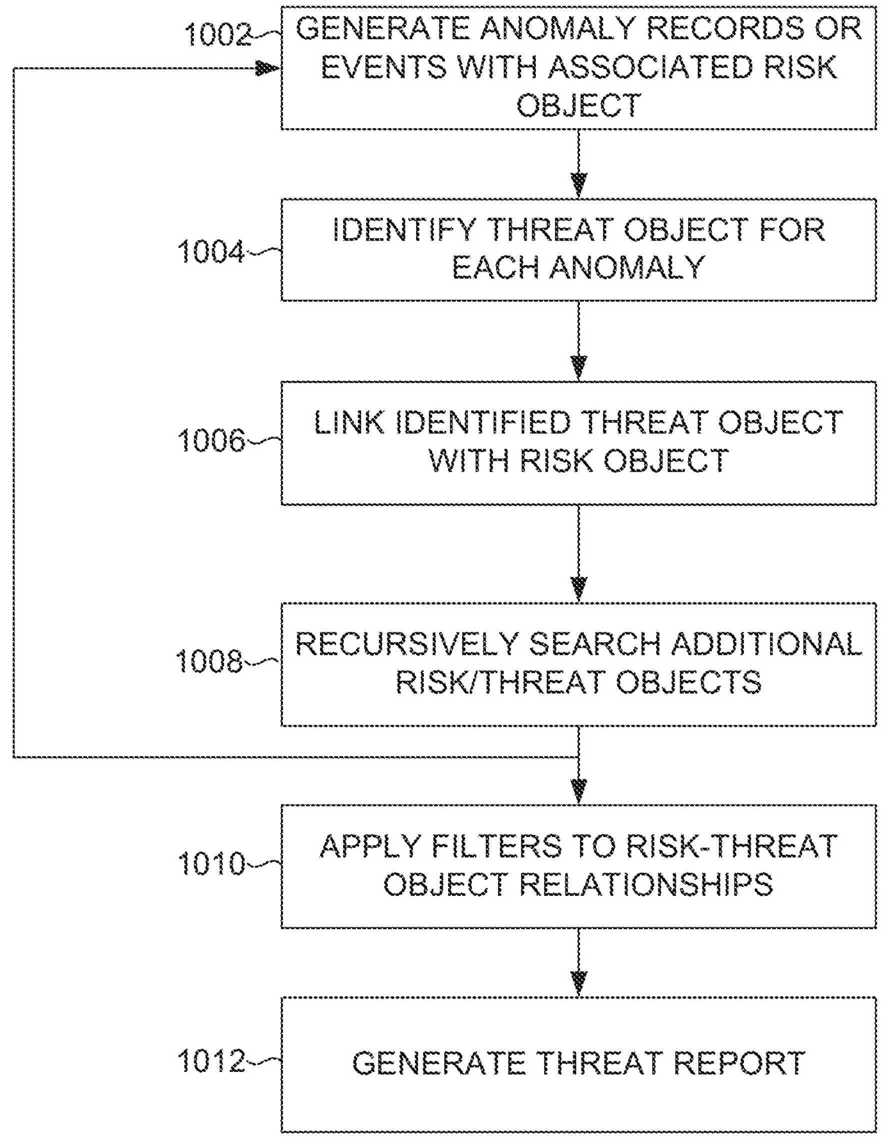
FIG. 10 is a flow diagram illustrating use of links between risk objects and threat objects to indicate an attack or malicious activity on a system or network.

FIG. 10 is a flow diagram illustrating an example of the use of links between risk objects and threat objects to indicate an attack or malicious activity on a system or network. At block 1002, the cybersecurity system generates a plurality of system anomaly records based on a plurality of system event records. Each of the plurality of system anomaly records is associated with a risk object. Each of the system anomaly records is indicative of a notable associated with performance or operation of an entity connected to or associated with a computer network. The risk object is a network device, an application, or user that triggered an associated system anomaly event.

At block 1004, a correlation rule-based search is performed on the plurality of system event records that enriches the events with a threat object for each of the risk objects. A threat object is an indicator of a network security threat. Examples of a threat object include an entity used by the risk object and is further is correlated with a known attack tactic, such as those cataloged by the MITRE ATT&CK framework. However, other tactic frameworks or behavioral analysis may be similarly applied. Illustrative example of threat objects are an executing process, a script, a received email, a file, a hash, a command, an IP address, a network port, or a machine the risk object was not expected on. A characteristic of the threat object is defined by the rule-based search of the plurality of system event records. For example, where the tactic is stealing network credentials or data, the risk object may be a particular device storing the data, and a threat object may be the process or program that is being used to exfiltrate the data. The process or program is noticed as having a higher bandwidth than usual.

At block 1006, the threat object is added to the event that includes the risk object by creating or modifying metadata of a respective system anomaly record. Enriching the event with a threat object links the threat object to the risk object in a searchable manner. The link is established based on the relationship between the threat object and the risk object. In some embodiments, this link is embodied and/or graphically illustrated in a node graph data structure where nodes represent the respective threat objects and risk objects and the links are represented by edges between the nodes.

At block 1008, the system recursively searches for additional risk/threat objects associated with the already-found risk/threat objects.

At block 1010, after completion of the recursive search, predetermined filters identify the relationships that are relevant based on characteristics thereof. For example, relationships with links are between a number (N) of risk objects and a number (M) of threat objects; the filters identify those relationships based on values of N and M. A given risk object may have multiple threat objects linked to it. Additionally, multiple risk objects may each have an instance of the same threat object linked to it. In some embodiments, relationships that tend toward extremes (e.g., with a significant disparity between values for N and M) are indicative of an attack or malicious activity on the subject network.

The predetermined filters are tuned between systems or networks with respect to baseline and variance models. In some embodiments, the values for N and M that remain after the filtering are variable. The variable values may be based on an impact of the threat object or a confidence that the threat object correlates to a predefined attack profile or an importance or risk potential of the risk object.

Based on the filtered relationships, a given threat object or set of threat objects may be classified as an indicator of compromise (IOC). For example, a threat object may be an IOC based on the existence of N risk objects linked to it. In another example, a threat object may be an IOC based on the existence of M other threat objects similarly linked to a given risk object.

At block 1012, a threat report indicates the relationships between the threat objects and the risk object, based on the linking and post filtering. Post filtering the amount of data in the report is reduced to a feasible amount and may be reviewed by an analyst. Prior to reduction, there will often be too much data for a human, or even a team of humans, to meaningfully review/analyze.

The relationships are displayed or otherwise output to a user based on satisfaction of predetermined thresholds. Examples of display to the user may include generation of a threat report, anomaly alerts, or graphical presentations depicting the links in the relationship(s). An example graphical display includes a node graph wherein the threat objects and risk objects are represented by a node connected by a corresponding edges between the nodes.

The search results in the threat report include reference to one or more events. A given search result may include multiple events in order to completely illustrate a relationship between a given set of threat objects and risk objects.

7.0 Graphical User Interface for Presentation of Network Security Risk and Threat Information By various GUI features, information regarding events, risk objects, threat objects, etc., can be presented visually to a user in an easy-to-understand manner, to facilitate analysis and, when appropriate, remedial action. In certain embodiments, a GUI according to the techniques introduced here enables a user to quickly and easily switch between various different views of related notables data, including an Incidents Review screen that lists both ordinary notables and risk notables, any of which can be selected by a user for further study, a Timeline View screen for any selected risk notable, and a Threat Topology View screen for any selected risk notable. From each of these GUI screens, the user is also enabled to “drill down” to access various additional information about underlying events (e.g., risk events and/or raw machine data events). Hence, the GUI techniques introduced here enable a user to access network security information (e.g., risk and threat information) seamlessly along with other notables information about a computer network, and enable the user to understand, evaluate and explore the network security information easily, thoroughly and efficiently.

Refer to FIG. 11A, which shows an example of an Incidents Review GUI screen 1100. The Incidents Review GUI screen 1100 contains a list of notables 1101 that satisfy a given search criterion or criteria (e.g., from a correlation search). Each line item in the list 1101 represents a different notable. The user can select a particular type of search (e.g., correlation search) from pulldown menu 1102, select to search by time or associations from pull-down menu 1103, and/or limit the search results temporally by using pulldown menus 1104.

In the illustrated embodiment, the list 1101 combines notables of two different types that satisfy the search and filter criteria, namely, ordinary notables (or simply “Notable”) and risk notables (also called risk objects), as indicated in the Type column. Each notable in the list is assigned a Title (a summary of the represented events), Type, Time, Security Domain, Urgency Level (e.g., High or Critical), Status, Owner and Disposition. Each of these columns/parameters may have a corresponding filter control in the GUI 1100, to allow filtering based on that parameter.

Additionally, each risk notable is assigned a Risk Object Name and an Aggregated Risk Score. The Number of Risk Events is also indicated for each risk notable. Various filters can be applied to the list. For example, each of the above-mentioned columns/parameters can have a separate filter, as shown. FIG. 11B shows an alternative embodiment 1110 of the Incidents Review GUI, in which the filter controls are hidden from view, but can be caused to be displayed by activating an All Filters control 1112.

Figure 12:
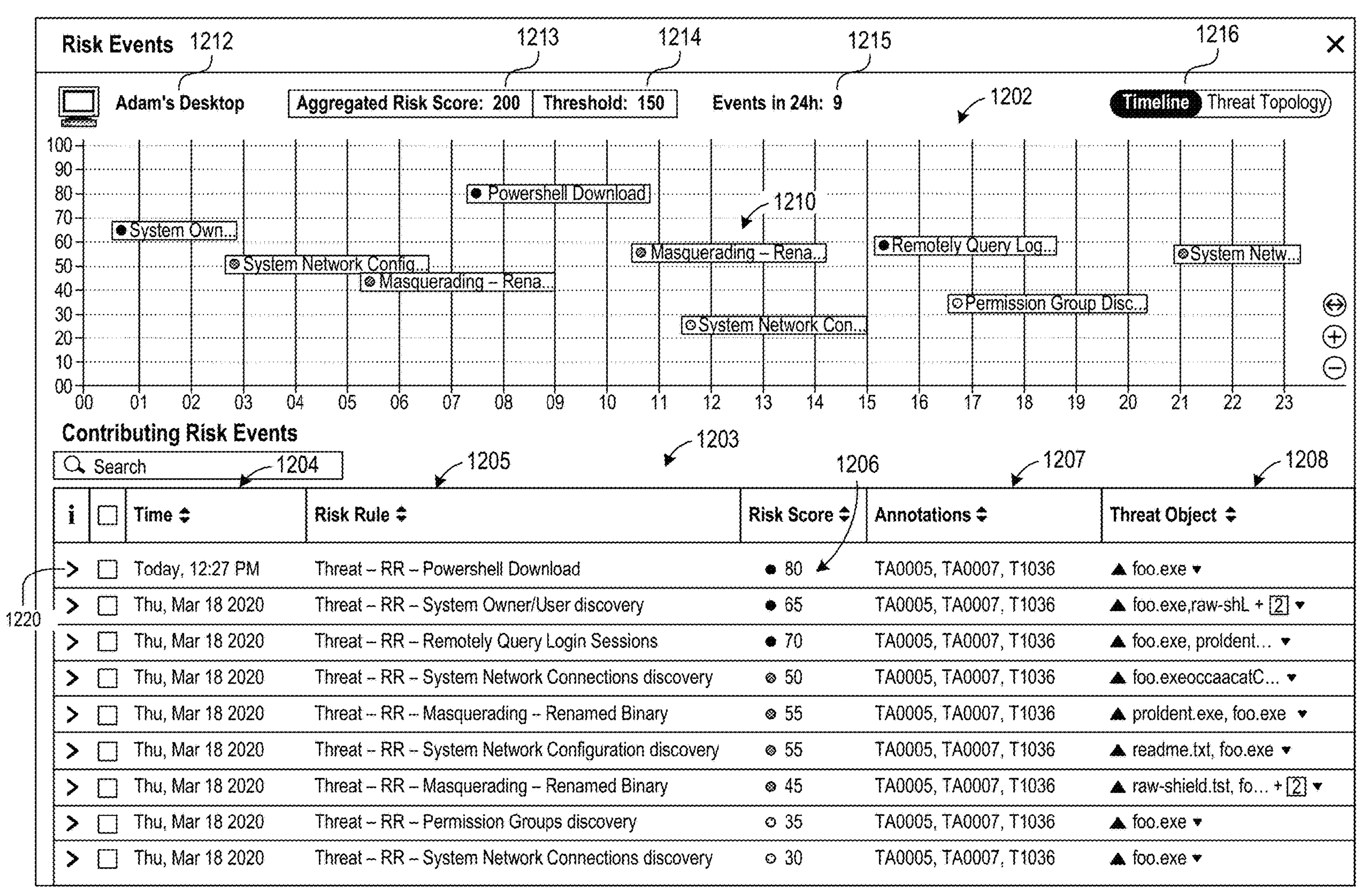
FIG. 12 illustrates an example of a Timeline View GUI screen.

By selecting the Risk Score value of a particular risk notable in the list 1101 (e.g., by holding the cursor over or clicking on it), the user can cause the GUI to display a Timeline view of that risk notable, an example of which is shown in FIG. 12. The Timeline view 1200 in FIG. 12 may be displayed as a modal over the GUI screen 1100 of FIG. 11A or 11B, or as an entirely new screen. In the example of FIG. 12, it can be assumed, for example, that the user has reached this screen by selecting the risk notable called Adam’s Desktop in the GUI 1100 FIG. 11A.

As shown, the Timeline view 1200 includes two screen portions, namely, a timeline graph 1202 and a risk event list 1203 of contributing risk events. The displayed contributing risk events are the risk events associated with the risk notable whose risk score was just selected. Each line item in the list 1203 of risk events represents a single risk event, although a single risk event may represent two or more underlying raw (machine data) events. Each line item in the list 1203 of contributing risk events includes a Time 1204 of the event (e.g., start time, end time or duration), an identifier 1205 of the Risk Rule that was applied to identify this risk event, the Risk Score 1206 of that risk event, identifiers 1207 of any Annotations associated with that risk event, and the name of the Threat Object 1208 associated with that risk event. A Threat Object may be, for example, an executable or script that has been determined to be malicious or suspicious (e.g., “foo.exe”) in the first line item in FIG. 12.

The timeline graph 1202 visually indicates the temporal relationships between the contributing risk events within the currently selected time period (e.g., the last 24 hours), including the times at which each risk event began and ended, and the severity level of each risk event. Each time bar, such as time bar 1210, represents a different risk event, i.e., a different item in list 1203. In the illustrated embodiment, time is indicated by the horizontal axis increasing from left to right, and severity is indicated by the vertical axis and/or by the color or shading of each time bar. Holding the cursor over a time bar, such as time bar 1210, causes a modal 1401 to appear with additional details about that risk event, including the event name, description, start time, MITRE tactic and MITRE technique, as illustrated in FIG. 14.

The GUI screen 1200 in FIG. 12 indicates the name 1212 of the selected risk notable (in this example, “Adam’s Desktop”), its aggregated risk score 1213, threshold value 1214, and number 1215 of contributing risk events detected in the selected time period. The user can select the time period that the timeline graph represents by using a control such as drop-down menu 1104 in FIG. 11A. The user can also cause the GUI to toggle between the Timeline view and a Threat Topology view by using a control 1216, as will be described further below.

Figure 13:
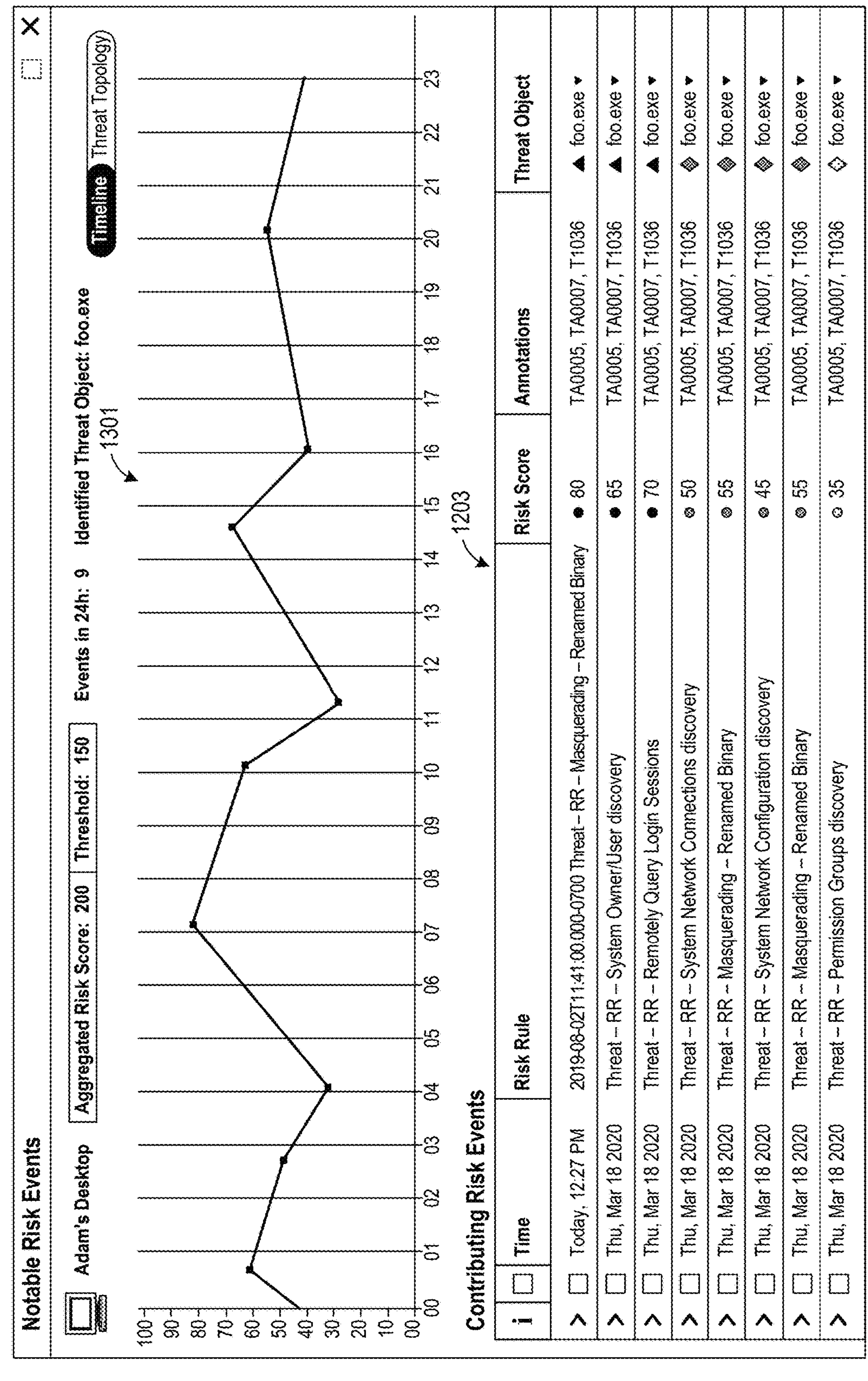
FIG. 13 illustrates another example of a Timeline View GUI screen.

FIG. 13 shows an alternative embodiment of the Timeline view 1300, in which the contributing risk events are represented by a line graph instead of time bars. In line graph 1301, points representing individual contributing risk events are connected by line segments to form a line graph. In some embodiments, the nature of the Timeline view (e.g., time bar or line graph) can be determined by a user controllable setting.

Figure 15:
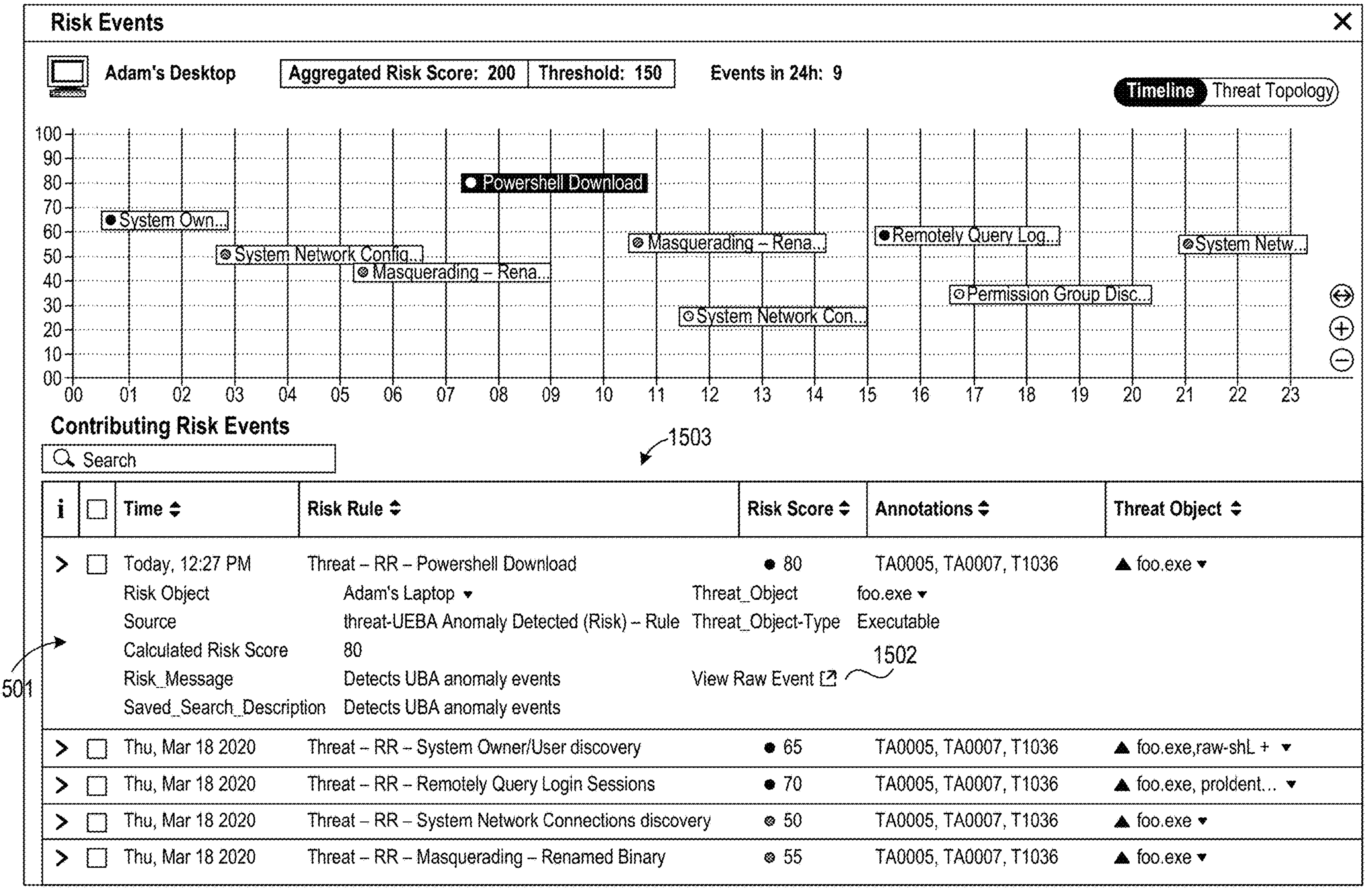
FIG. 15 shows an example of a Timeline View GUI screen in which a listed risk event has been expanded to show additional details.

In at least some embodiments, clicking on the arrow 1220 (FIG. 12) at the far left of a line item representing a risk event causes that risk event to be expanded display more details associated with that risk event. For example, as illustrated in FIG. 15, a risk event 1501 can be expanded in the list to display details such as such as the risk event's associated risk object, source, calculated risk score, risk messages, saved search description, and the name and type of the associated threat object. When the user clicks the link 1502, the GUI will open a new browser tab that shows the underlying raw events in the search workspace.

Figure 16:
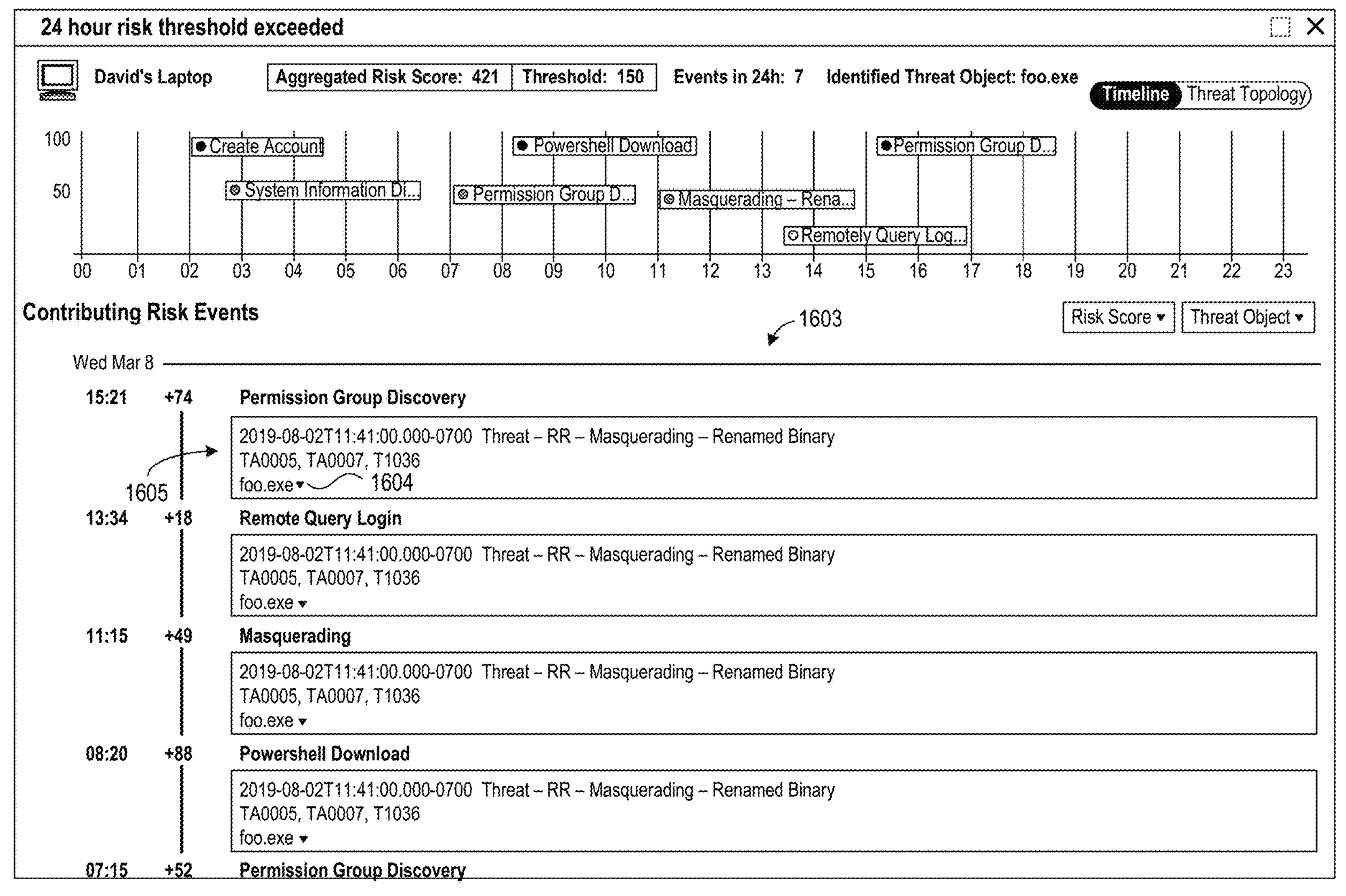
FIG. 16 shows an example of a Timeline View GUI screen that is an alternative embodiment to that of FIG. 12.
Figure 17:
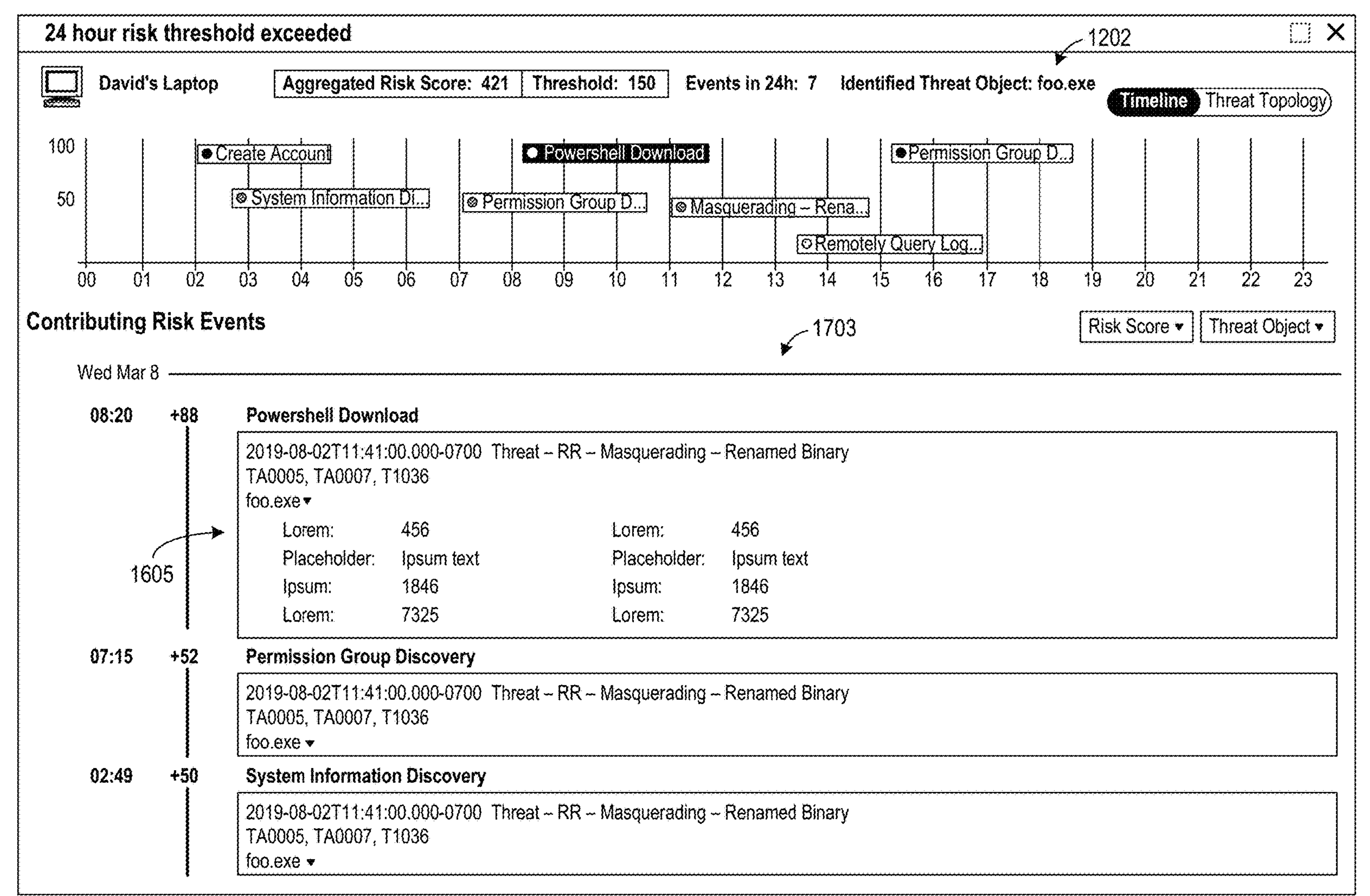
FIG. 17 shows an example of a Timeline View GUI screen that is an alternative embodiment to that of FIG. 15.

The bottom portion 1603 of the screen in FIG. 16 shows an alternative embodiment of the bottom portion 1203 of the screen in FIG. 12 (for a different notable, called David's Laptop). Similarly, the bottom portion 1703 of the screen in FIG. 17 is an alternate view of the bottom portion 1503 of the screen in FIG. 15.

Figure 18:
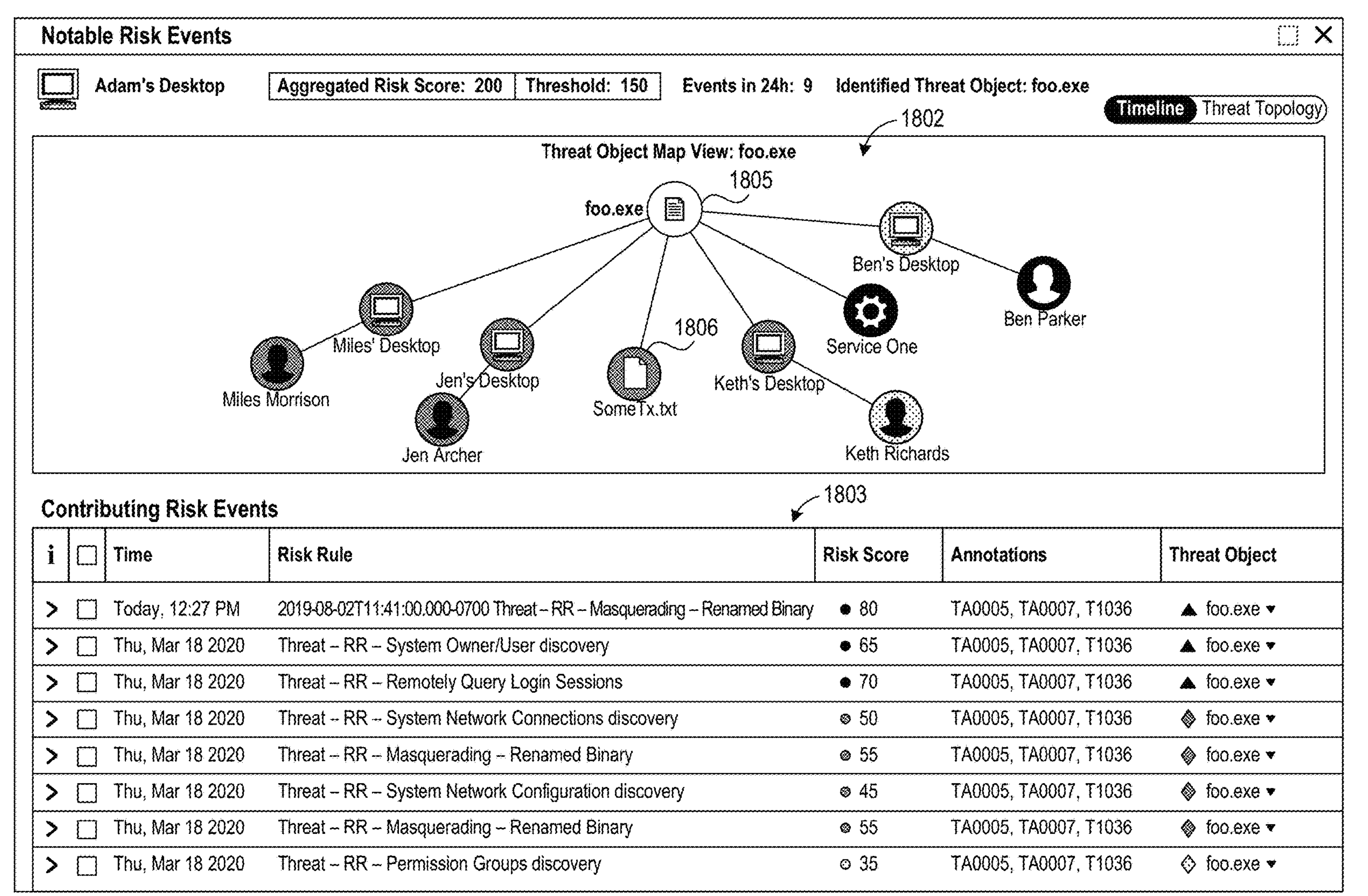
FIG. 18 shows an example of a Threat Topology view associated with a given threat object.

Referring again to FIG. 12, when a particular risk notable has been selected in the GUI screen 1200, the user can toggle the view between the Timeline view and a Threat Topology view by clicking on control 1216. FIG. 18 illustrates an example of a GUI screen 1800 including the Threat Topology view. The Threat Topology view includes a list 1803 of contributing risk events as in the Timeline View of FIG. 12; however, the timeline graph of FIG. 12 is replaced by a node graph 1802, including nodes that represent objects and line segments that interconnect those nodes to show the relationships between the represented objects. In particular, the threat object for the selected risk event is represented by a central node 1805 (e.g., a circle), which in this example is the executable, "foo.exe." Additional nodes 1806 represent, as risk objects, each of the network entities (users, devices and/or applications) with which the threat object has interacted during the currently selected time period. Clicking on any node in the graph 1803 causes the GUI to display additional details about the object represented by that node. For example, by clicking on any risk object node 1806 the user can cause the GUI 1800 to display a topology graphic and/or listing of all threat objects with which the represented entity (user, device or application) has interacted during the currently selected time period (including the currently displayed threat object). In some embodiments, instead of toggling between Timeline View and Threat Topology view, the threat topology graph 1803 may instead be displayed as an overlay on top of the Timeline view (which may be triggered, for example, by the user holding the mouse pointer over the displayed name of a threat object in list 1203).

Figure 19:
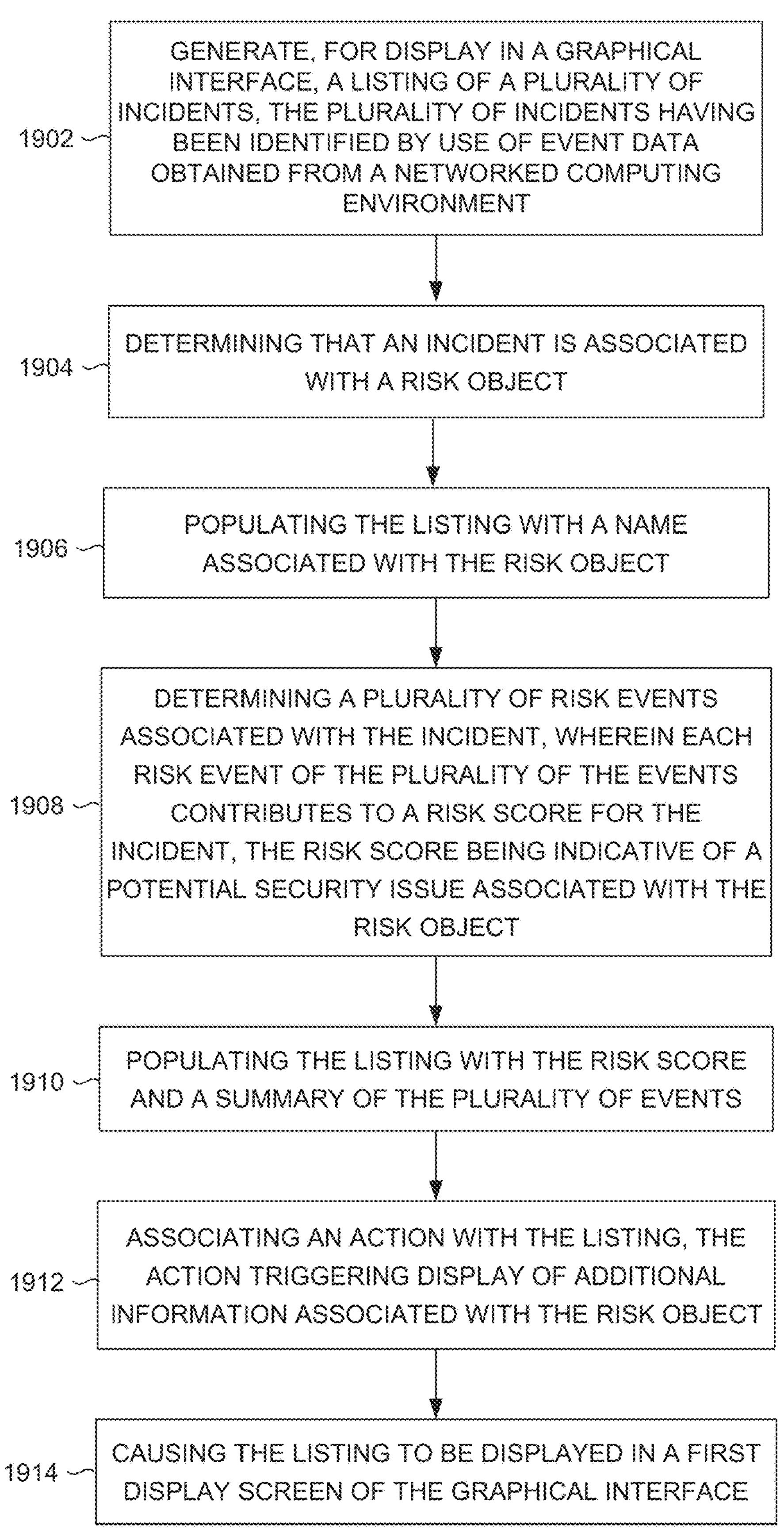
FIG. 19 is a flow diagram illustrating a process of generating a GUI to enable a user to view risk and threat information about a computer network.

FIG. 19 shows an example of a process that one or more processors in a computer system may execute to provide a GUI such as described above. The process begins at step 1902 with generating, for display in a graphical interface, a listing of a plurality of incidents, wherein the plurality of incidents have been identified by use of event data obtained from a networked computing environment. Next, at step 1904 the process determines that an incident of the plurality of incidents is associated with a risk object, wherein a risk object is a component of the networked computing environment. The process populates the listing of the plurality of incidents with a name associated with the risk object at step 1906. The process determines a plurality of risk events associated with the incident at step 1908, wherein each risk event of the plurality of the events contributes to a risk score for the incident. The risk score is indicative of a potential security issue associated with the risk object. At step 1910, the process populates the listing of the plurality of incidents with the risk score and a summary of the plurality of events. At step 1912 the process associates an action with the listing of the plurality of incidents, wherein the action is for triggering display of additional information associated with the risk object. Note that steps 1904 through 1912 may be sub-steps of step 1902. Then, at step 1914 the process causing the listing of the plurality of incidents to be displayed in a first display screen of the graphical interface on a display device.

8.0. Exemplary Computing Device

Figure 20:
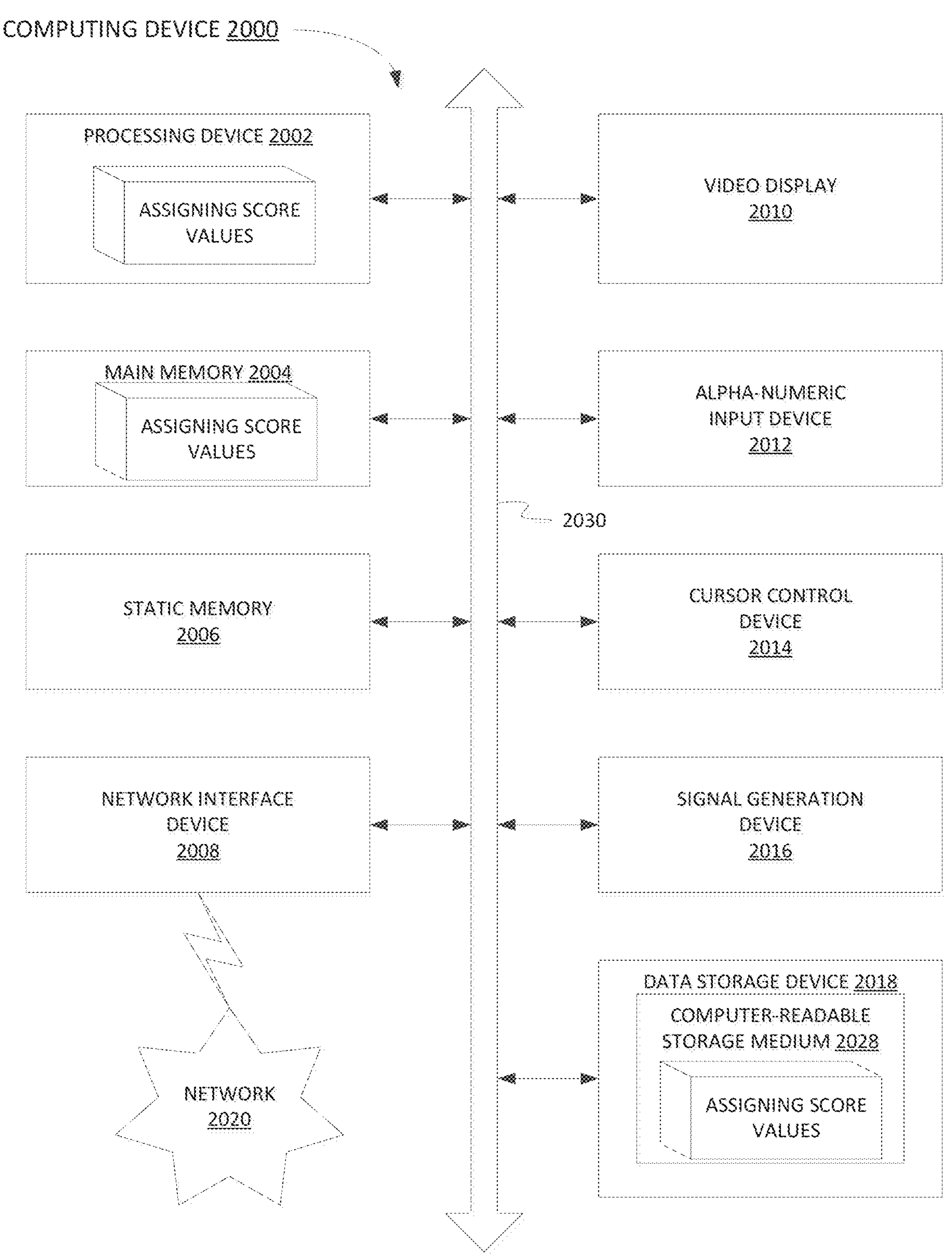
FIG. 20 illustrates a diagrammatic representation of a computing device within which a set of instructions for causing the computing device to perform the methods discussed herein may be executed.

FIG. 20 illustrates a diagrammatic representation of a computing device 2000 within which a set of instructions for causing the computing device to perform the methods discussed herein may be executed. The computing device 2000 may be connected to other computing devices in a LAN, an intranet, an extranet, and/or the Internet. The computing device 2000 may operate in the capacity of a server machine in client-server network environment. The computing device 2000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 2000 may implement the above described methods for assigning scores to objects based on evaluating triggering conditions applied to datasets produced by search queries.

The exemplary computing device 2000 may include a processing device (e.g., a general-purpose processor) 2002, a main memory 2004 (e.g., synchronous dynamic random-access memory (DRAM), read-only memory (ROM)), a static memory 2006 (e.g., flash memory and a data storage device 2018), which may communicate with each other via a bus 2030.

The processing device 2002 may be provided by one or more general-purpose processing devices such as a microprocessor, central processing unit, or the like. In an illustrative example, the processing device 2002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2002 may also comprise one or more special-purpose processing devices, such as an application specific integrated circuit (ASIC), a field programmable gate array (FPGA), a digital signal processor (DSP), a network processor, or the like. The processing device 2002 may be configured to execute the methods described herein, in accordance with one or more aspects of the present disclosure.

The computing device 2000 may further include a network interface device 2008, which may communicate with a network 2019. The computing device 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse) and an acoustic signal generation device 2016 (e.g., a speaker). In one embodiment, video display unit 2010, alphanumeric input device 2012, and cursor control device 2014 may be combined into a single component or device (e.g., an LCD touch screen).

The data storage device 2018 may include a computer-readable storage medium 2028 on which may be stored one or more sets of instructions (e.g., instructions of the methods described herein, in accordance with one or more aspects of the present disclosure) implementing any one or more of the methods or functions described herein. Instructions implementing methods may also reside, completely or at least partially, within main memory 2004 and/or within processing device 2002 during execution thereof by computing device 2000, main memory 2004 and processing device 2002 also constituting computer-readable media. The instructions may further be transmitted or received over a network 2020 via network interface device 2008.

While computer-readable storage medium 2028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

9.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

10.0 Examples of Certain Embodiments

Certain embodiments of the technology introduced herein are summarized in the following numbered examples.

10.1 Examples Related to Identification of Threat Objects and Analysis of Linked Risk Objects and Threat Objects 1. A method implemented using a computing device, comprising: generating a plurality of notable event records based on a plurality of event records, wherein an event record is a record of activity of an entity on a computer network, wherein a notable event record is indicative of a potential security threat associated with a respective entity on the computer network, wherein the notable event record contains an association of the respective entity with a risk object, and wherein the notable event record further contains an association of the potential security threat with a threat object; identifying a particular risk object by performing a rule-based search on the plurality of notable event records, wherein the rule-based search defines a characteristic of the particular risk object; determining a threat object associated with the risk object, based on the plurality of notable event records; generating a threat report that identifies the particular risk object, wherein the threat report indicates an association between the particular risk object and the threat object; and outputting the threat report for display.
2. The method of example 1, wherein said determining a threat object determines one or more threat objects and the characteristic of the particular risk object is a count of threat objects associated with the risk object.
3. The method of example 1 or example 2, further comprising: determining a threshold number of risk objects associated with a particular threat object, wherein the threshold number of risk objects are determined using the plurality of notable event records.
4. The method of any one or more of examples 1 through 3, further comprising: generating for display a node graph wherein the particular risk object is represented by a first node and the threat object is linked to the particular risk object represented by a corresponding node connected by a corresponding edge to the first node.

5. The method of any one or more of examples 1 through 4, wherein the threat report groups a plurality of notable event records pertaining to the particular risk object together.

6. The method of any one or more of examples 1 through 5, wherein the plurality of notable event records are defined by a search query, wherein the search query includes parameters describing risk objects and threat objects to associate with event records identified by the search query.

7. The method of any one or more of examples 1 through 6, wherein the plurality of notable event records each further contain an association of potential security threats with network attack tactics.

8. The method of any one or more of examples 1 through 7, wherein the threat report further indicates network attack tactics associated with the threat object.

9. The method of any one or more of examples 1 through 8, wherein the rule-based search determines one or more characteristics of the particular risk object using multiple notable events from the plurality of notable events, wherein each of the multiple notable events are associated with the particular risk object.

10. A computing device, comprising: a processor; and a non-transitory computer-readable medium having stored thereon instructions that, when executed by the processor, cause the processor to perform operations including: generating a plurality of notable event records based on a plurality of event records, wherein an event record is a record of activity of an entity on a computer network, wherein a notable event record is indicative of a potential security threat associated with a respective entity on the computer network, wherein the notable event record contains an association of the respective entity with a risk object, and wherein the notable event record further contains an association of the potential security threat with a threat object; identifying a particular risk object by performing a rule-based search on the plurality of notable event records, wherein the rule-based search defines a characteristic of the particular risk object; determining a threat object associated with the risk object, based on the plurality of notable event records; generating a threat report that identifies the particular risk object, wherein the threat report indicates an association between the particular risk object and the threat object; and outputting the threat report for display.

11. The computing device of example 10, wherein said determining a threat object determines one or more threat objects and the characteristic of the particular risk object is a count of threat objects associated with the risk object.

12. The computing device of example 10 or example 11, wherein the performed operations further include: determining a threshold number of risk objects associated with a particular threat object, wherein the threshold number of risk objects are determined using the plurality of notable event records.

13. The computing device of any one or more of examples 10 through 12, wherein the performed operations further include: generating for display a node graph wherein the particular risk object is represented by a first node and the one or more threat objects are linked to the particular risk object represented by a corresponding node connected by a corresponding edge to the first node.

14. The computing device of any one or more of examples 10 through 13, wherein the threat report further indicates network attack tactics associated with the threat object.

15. A non-transitory computer-readable medium having stored thereon instructions that, when executed by one or more processors, cause the one or more processor to perform operations including: generating a plurality of notable event records based on a plurality of event records, wherein an event record is a record of activity of an entity on a computer network, wherein a notable event record is indicative of a potential security threat associated with a respective entity on the computer network, wherein the notable event record contains an association of the respective entity with a risk object, and wherein the notable event record further contains an association of the potential security threat with a threat object; identifying a particular risk object by performing a rule-based search on the plurality of notable event records, wherein the rule-based search defines a characteristic of the particular risk object; determining a threat object associated with the risk object, based on the plurality of notable event records; generating a threat report that identifies the particular risk object, wherein the threat report indicates an association between the particular risk object and the threat object; and outputting the threat report for display.

16. The computer-readable medium of example 15, wherein the characteristic of the particular risk object is a number of threat objects associated with the risk object.

17. The computer-readable medium of example 15 or example 16, wherein the performed operations further include: determining a threshold number of risk objects associated with a particular threat object, wherein the threshold number of risk objects are determined using the plurality of notable event records.

18. The computer-readable medium of any one or more of examples 15 through 17, wherein the performed operations further include: generating for display a node graph wherein the particular risk object is represented by a first node and the one or more threat objects are linked to the particular risk object represented by a corresponding node connected by a corresponding edge to the first node.

19. The computer-readable medium of any one or more of examples 15 through 18, wherein the threat report groups a plurality of notable event records pertaining to the particular risk object together.

20. The computer-readable medium of any one or more of examples 15 through 19, wherein the threat report further indicates network attack tactics associated with the threat object.

21. An apparatus comprising: means for generating a plurality of notable event records based on a plurality of event records, wherein an event record is a record of activity of an entity on a computer network, wherein a notable event record is indicative of a potential security threat associated with a respective entity on the computer network, wherein the notable event record contains an association of the respective entity with a risk object, and wherein the notable event record further contains an association of the potential security threat with a threat object; means for identifying a particular risk object by performing a rule-based search on the plurality of notable event records, wherein the rule-based search defines a characteristic of the particular risk object; means for determining a threat object associated with the risk object, based on the plurality of notable event records; means for generating a threat report that identifies the particular risk object, wherein the threat report indicates an association between the particular risk object and the threat object; and means for outputting the threat report for display.

22. The apparatus of example 21, wherein said means for determining a threat object determines one or more threat objects and the characteristic of the particular risk object is a count of threat objects associated with the risk object.

23. The apparatus of example 21 or example 22, further comprising: means for determining a threshold number of risk objects associated with a particular threat object, wherein the threshold number of risk objects are determined using the plurality of notable event records.

24. The apparatus of any one or more of examples 21 through 23, further comprising: means for generating for display a node graph wherein the particular risk object is represented by a first node and the threat object is linked to the particular risk object represented by a corresponding node connected by a corresponding edge to the first node.

25. The apparatus of any one or more of examples 21 through 24, wherein the threat report groups a plurality of notable event records pertaining to the particular risk object together.

26. The apparatus of any one or more of examples 21 through 25, wherein the plurality of notable event records are defined by a search query, wherein the search query includes parameters describing risk objects and threat objects to associate with event records identified by the search query.

27. The apparatus of any one or more of examples 21 through 26, wherein the plurality of notable event records each further contain an association of potential security threats with network attack tactics.

28. The apparatus of any one or more of examples 21 through 27, wherein the threat report further indicates network attack tactics associated with the threat object.

29. The apparatus of any one or more of examples 21 through 28, wherein the rule-based search determines one or more characteristics of the particular risk object using multiple notable events from the plurality of notable events, wherein each of the multiple notable events are associated with the particular risk object.

10.2 Examples Related to Graphical User Interface for Presentation of Risk and Threat Information 1. A computer-implemented method comprising: generating, for display in a graphical interface, a listing of a plurality of incidents, the plurality of incidents having been identified by use of event data obtained from a networked computing environment; determining that an incident of the plurality of incidents is associated with a risk object, wherein a risk object is a component of the networked computing environment; populating the listing of the plurality of incidents with a name associated with the risk object; determining a plurality of risk events associated with the incident, wherein each risk event of the plurality of the events contributes to a risk score for the incident, the risk score being indicative of a potential security issue associated with the risk object; populating the listing of the plurality of incidents with the risk score and a summary of the plurality of events; associating an action with the listing of the plurality of incidents, the action for triggering display of additional information associated with the risk object; and causing the listing of the plurality of incidents to be displayed in a first display screen of the graphical interface.

2. The method of example 1, wherein the component has been tagged as a risk object as a result of a determination of one or more risk events being associated with the risk object.

3. The method of example 1 or example 2, wherein the determining a plurality of risk events associated with the incident is based on a search of the event data obtained from the networked computing environment.

4. The method of any one or more of examples 1 through 3, wherein the determining a plurality of risk events associated with the incident comprises determining, by use of a search of the event data obtained from the networked computing environment, that the risk events are associated with a known attack tactic.

5. The method of any one or more of examples 1 through 4, further comprising: identifying the plurality of incidents from a plurality of event records; and classifying at least one of the incidents as a risk notable, wherein each incident classified as a risk notable is deemed indicative of a potential security threat to the networked computing environment and contains an identification of a corresponding risk object.

6. The method of any one or more of examples 1 through 5, wherein the risk score is calculated based on a user-specified risk score modifier.

7. The method of any one or more of examples 1 through 6, wherein the risk score is calculated by applying a user-specified risk score modifier to events that satisfy a search query at least a specified number of times.

8. The method of any one or more of examples 1 through 7, wherein the action comprises a first user input directed to a portion of the incident in the listing as displayed in the first display screen, the method further comprising, in response to the first user input, causing display of a second display screen including a listing of risk events associated with the incident.

9. The method of any one or more of examples 1 through 8, wherein the action comprises a first user input directed to a portion of the incident in the listing as displayed in the first display screen, the method further comprising, in response to the first user input, causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events.

10. The method of any one or more of examples 1 through 9, wherein the action comprises a first user input directed to a portion of the incident in the listing as displayed in the first display screen, the method further comprising, in response to the first user input, causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data.

11. The method of any one or more of examples 1 through 10, wherein the action comprises a first user input directed to a portion of the incident in the listing as displayed in the first display screen, the method further comprising, in response to the first user input, causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen.

12. The method of any one or more of examples 1 through 11, wherein the action comprises a first user input directed to a portion of the incident in the listing as displayed in the first display screen, the method further comprising, in response to the first user input, causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen, wherein the additional details include a name of the risk event, a time of the risk event, a description of the risk event, a MITRE tactic associated with the risk event and a MITRE technique associated with the risk event.

13. The method of any one or more of examples 1 through 12, wherein the action comprises a first user input directed to a portion of the incident in the listing as displayed in the first display screen, the method further comprising, in response to the first user input, causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen, wherein the second display screen further includes a user control, activation of which causes display of a list of underlying raw events associated with the risk event, each of the underlying raw events containing machine data.

14. The method of any one or more of examples 1 through 13, the method further comprising:
causing display of a second display screen including a listing of risk events associated with the incident, each risk event in the listing of risk events including an identification of a threat object associated with the risk event, the display screen further including a graph corresponding to a selected risk event in the listing, the graph visually indicating a threat object associated with the selected risk event and relationships between the threat object and a plurality of network entities that have interacted with the threat object.

15. A non-transitory machine-readable storage medium tangibly embodying instructions, execution of which in a computer system cause the computer system to perform operations comprising: generating, for display in a graphical interface, a listing of a plurality of incidents, the plurality of incidents having been identified by use of event data obtained from a networked computing environment; determining that an incident of the plurality of incidents is associated with a risk object, wherein a risk object is a component of the networked computing environment; populating the listing of the plurality of incidents with a name associated with the risk object; determining a plurality of risk events associated with the incident, wherein each risk event of the plurality of the events contributes to a risk score for the incident, the risk score being indicative of a potential security issue associated with the risk object; populating the listing of the plurality of incidents with the risk score and a summary of the plurality of events; associating an action with the listing of the plurality of incidents, the action for triggering display of additional information associated with the risk object; and causing the listing of the plurality of incidents to be displayed in a first display screen of the graphical interface.

16. The non-transitory machine-readable storage medium of example 15, wherein the component has been tagged as a risk object as a result of a determination of one or more risk events being associated with the risk object.

17. The non-transitory machine-readable storage medium of example 15 or example 16, wherein the determining a plurality of risk events associated with the incident is based on a search of the event data obtained from the networked computing environment.

18. A processing system comprising: a communications interface; a memory; and a processor coupled to the communications interface and the memory, and configured to execute instructions to cause the processing system to perform operations comprising: generating, for display in a graphical interface, a listing of a plurality of incidents, the plurality of incidents having been identified by use of event data obtained from a networked computing environment; determining that an incident of the plurality of incidents is associated with a risk object, wherein a risk object is a component of the networked computing environment; populating the listing of the plurality of incidents with a name associated with the risk object; determining a plurality of risk events associated with the incident, wherein each risk event of the plurality of the events contributes to a risk score for the incident, the risk score being indicative of a potential security issue associated with the risk object; populating the listing of the plurality of incidents with the risk score and a summary of the plurality of events; associating an action with the listing of the plurality of incidents, the action for triggering display of additional information associated with the risk object; and causing the listing of the plurality of incidents to be displayed in a first display screen of the graphical interface.

19. The processing system of example 18, wherein the risk score is calculated based on a user-specified risk score modifier.

20. The processing system of example 18 or example 19, wherein the risk score is calculated by applying a user-specified risk score modifier to events that satisfy a search query.

21. An apparatus comprising: means for generating, for display in a graphical interface, a listing of a plurality of incidents, the plurality of incidents having been identified by use of event data obtained from a networked computing environment; means for determining that an incident of the plurality of incidents is associated with a risk object, wherein a risk object is a component of the networked computing environment; means for populating the listing of the plurality of incidents with a name associated with the risk object; means for determining a plurality of risk events associated with the incident, wherein each risk event of the plurality of the events contributes to a risk score for the incident, the risk score being indicative of a potential security issue associated with the risk object; means for populating the listing of the plurality of incidents with the risk score and a summary of the plurality of events; means for associating an action with the listing of the plurality of incidents, the action for triggering display of additional information associated with the risk object; and means for causing the listing of the plurality of incidents to be displayed in a first display screen of the graphical interface.

22. The apparatus of example 21, wherein the component has been tagged as a risk object as a result of a determination of one or more risk events being associated with the risk object.

23. The apparatus of example 21 or example 22, wherein the determining a plurality of risk events associated with the incident is based on a search of the event data obtained from the networked computing environment.

24. The apparatus of any one or more of examples 21 through 23, wherein the determining a plurality of risk events associated with the incident comprises determining, by use of a search of the event data obtained from the networked computing environment, that the risk events are associated with a known attack tactic.

25. The apparatus of any one or more of examples 21 through 24, further comprising: means for identifying the plurality of incidents from a plurality of event records; and means for classifying at least one of the incidents as a risk notable, wherein each incident classified as a risk notable is deemed indicative of a potential security threat to the networked computing environment and contains an identification of a corresponding risk object.

26. The apparatus of any one or more of examples 21 through 25, wherein the risk score is calculated based on a user-specified risk score modifier.

27. The apparatus of any one or more of examples 21 through 26, wherein the risk score is calculated by applying a user-specified risk score modifier to events that satisfy a search query at least a specified number of times.

28. The apparatus of any one or more of examples 21 through 27, wherein the action comprises a first user input directed to a portion of the incident in the listing as displayed in the first display screen, the apparatus further comprising, means, in response to the first user input, for causing display of a second display screen including a listing of risk events associated with the incident.

29. The apparatus of any one or more of examples 21 through 28, wherein the action comprises a first user input directed to a portion of the incident in the listing as displayed in the first display screen, the apparatus further comprising, means, in response to the first user input, for causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events.

30. The apparatus of any one or more of examples 21 through 29, wherein the action comprises a first user input directed to a portion of the incident in the listing as displayed in the first display screen, the apparatus further comprising, means, in response to the first user input, for causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data.

31. The apparatus of any one or more of examples 21 through 30, wherein the action comprises a first user input directed to a portion of the incident in the listing as displayed in the first display screen, the apparatus further comprising, means, in response to the first user input, for causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen.

32. The apparatus of any one or more of examples 21 through 31, wherein the action comprises a first user input directed to a portion of the incident in the listing as displayed in the first display screen, the apparatus further comprising, means, in response to the first user input, for causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen, wherein the additional details include a name of the risk event, a time of the risk event, a description of the risk event, a MITRE tactic associated with the risk event and a MITRE technique associated with the risk event.

33. The apparatus of any one or more of examples 21 through 32, wherein the action comprises a first user input directed to a portion of the incident in the listing as displayed in the first display screen, the apparatus further comprising, means, in response to the first user input, for causing display of a second display screen including a listing of risk events associated with the incident, the second display screen further including a timeline graphic indicative of the risk events in the listing of risk events, the timeline graphic indicating a time period during which each risk event in the listing of risk events occurred and a severity level of each risk event in the listing of risk events, wherein at least one of the one or more risk events indicated in the timeline graphic represents a plurality of underlying raw events, each of the underlying raw events containing machine data, wherein a second user input directed to a risk event indicated in the timeline graphic causes display of additional details about the risk event in the second display screen, wherein the second display screen further includes a user control, activation of which causes display of a list of underlying raw events associated with the risk event, each of the underlying raw events containing machine data.

34. The apparatus of any one or more of examples 21 through 33, the apparatus further comprising:

means for causing display of a second display screen including a listing of risk events associated with the incident, each risk event in the listing of risk events including an identification of a threat object associated with the risk event, the display screen further including a graph corresponding to a selected risk event in the listing, the graph visually indicating a threat object associated with the selected risk event and relationships between the threat object and a plurality of network entities that have interacted with the threat object.

What is claimed is:

1. A method comprising:

accessing a plurality of event records, each of which is indicative of activity of an entity on a computer network;

identifying a plurality of risk events based on the plurality of event records, each risk event of the plurality of risk events being an event deemed indicative of a potential security threat to the computer network, wherein each risk event is associated with a corresponding risk object that generates the risk event, and wherein each risk event is associated with a corresponding threat object that is used, received, interacted with, or acted upon by the corresponding risk object in association with the risk event;

causing display of a first display screen that includes a first listing of a plurality of risk objects, each being associated with one or more risk events; and causing, in response to a first user input directed to a particular risk object, display of a second display screen that includes a second listing of one or more risk events associated with the particular risk object, each risk event in the second listing including an identification of a threat object associated with the risk event, the second display screen further including a graph corresponding to a selected risk event in the second listing, the graph comprises a first node representing a threat object associated with the selected risk event, one or more second nodes, each representing one of one or more network entities that have interacted with the threat object, and one or more edges, wherein each of the one or more edges connects the first node and one of the one or more second nodes representing relationships between the threat object represented by the first node and a network entity represented by the connected second node.

2. The method of claim 1, further comprising:

determining a risk score for each risk event of the plurality of risk events, wherein the first display screen includes an indication of the risk score of each risk event of the plurality of risk events.

3. The method of claim 1, further comprising:

determining a risk score for each risk event of the plurality of risk events, wherein the first display screen includes an indication of the risk score of each risk event of the plurality of risk events, wherein each risk event of the plurality of the events contributes to a risk score for an incident, the incident being associated with all of the plurality of risk events.

4. The method of claim 1, further comprising:

determining a risk score for each risk event of the plurality of risk events, wherein the first display screen includes an indication of the risk score of each risk event of the plurality of risk events, wherein each risk event of the plurality of the events contributes to an incident risk score for an incident, the incident being associated with all of the plurality of risk events; and causing display of a third display screen that includes a listing of a plurality of incidents, including the incident, wherein the third display screen indicates at least one of the plurality of incidents as being a risk notable with an associated risk score, and indicates at least one other of the plurality of incidents as being an ordinary notable.

5. The method of claim 1, wherein the identifying a plurality of risk events is based on a search of the event records.

6. The method of claim 1, wherein the identifying a plurality of risk events comprises determining, by use of a search of the event records, that the risk events are associated with a known attack tactic.

7. The method of claim 1, further comprising:

identifying a plurality of incidents from the plurality of event records; and classifying at least one of the incidents as a risk notable, wherein each incident classified as a risk notable is deemed indicative of a potential security threat to a networked computing environment and contains an identification of a corresponding risk object.

8. The method of claim 1, wherein each risk event of the plurality of the events contributes to a risk score for an incident, the risk score being indicative of a potential security issue associated with the risk object, and wherein the risk score is calculated based on a user-specified risk score modifier.

9. The method of claim 1, wherein each risk event of the plurality of the events contributes to a risk score for an incident, the risk score being indicative of a potential security issue associated with the risk object, and wherein the risk score is calculated by applying a user-specified risk score modifier to events that satisfy a search query at least a specified number of times.

10. The method of claim 1, further comprising, in response to a first user input, causing display of a fourth display screen including the listing of the plurality of risk events, the fourth display screen further including a timeline graphic indicative of the plurality of risk events, the timeline graphic indicating a time period during which each risk event in the plurality of risk events occurred and a severity level of each risk event in the plurality of risk events.

11. The method of claim 1, in response to a first user input, causing display of a fourth display screen including the listing of the plurality of risk events, the fourth display screen further including a timeline graphic indicative of the plurality of risk events, the timeline graphic indicating a time period during which each risk event in the plurality of risk events occurred and a severity level of each risk event in the plurality of risk events, wherein at least one of the plurality of risk events indicated in the timeline graphic represents a plurality of underlying raw events, each of the underlying raw events containing machine data.

12. The method of claim 1, further comprising, in response to a first user input, causing display of a fourth display screen including a listing of risk events associated with an incident, the fourth display screen further including a timeline graphic indicative of the risk events in the listing of risk events, the timeline graphic indicating a time period during which each risk event in the listing of risk events occurred and a severity level of each risk event in the listing of risk events, wherein at least one risk event represented in the timeline graphic represents a plurality of underlying raw events, each of the underlying raw events containing machine data, wherein a second user input directed to a risk event indicated in the timeline graphic causes display of additional details about the risk event in the fourth display screen.

13. At least one non-transitory machine-readable storage medium tangibly embodying instructions, execution of which in a computer system cause the computer system to perform operations comprising:

accessing a plurality of event records, each of which is indicative of activity of an entity on a computer network;

identifying a plurality of risk events based on the plurality of event records, each risk event of the plurality of risk events being an event deemed indicative of a potential security threat to the computer network, wherein each risk event is associated with a corresponding risk object that generates the risk event, and wherein each risk event is associated with a corresponding threat object that is used, received, interacted with, or acted upon by the corresponding risk object in association with the risk event;

causing display of a first display screen that includes a first listing of a plurality of risk objects, each being associated with one or more risk events; and causing, in response to a first user input directed to a particular risk object, display of a second display screen that includes a second listing of one or more risk events associated with the particular risk object, each risk event in the second listing including an identification of a threat object associated with the risk event, the second display screen further including a graph corresponding to a selected risk event in the second listing, the graph comprises a first node representing a threat object associated with the selected risk event, one or more second nodes, each representing one of one or more network entities that have interacted with the threat object, and one or more edges, wherein each of the one or more edges connects the first node and one of the one or more second nodes representing relationships between the threat object represented by the first node and a network entity represented by the connected second node.

14. The at least one non-transitory machine-readable storage medium of claim 13, such that the operations further comprise:

determining a risk score for each risk event of the plurality of risk events, wherein the first display screen includes an indication of the risk score of each risk event of the plurality of risk events.

15. The at least one non-transitory machine-readable storage medium of claim 13, such that the operations further comprise:

determining a risk score for each risk event of the plurality of risk events, wherein the first display screen includes an indication of the risk score of each risk event of the plurality of risk events, wherein each risk event of the plurality of the events contributes to a risk score for an incident, the incident being associated with all of the plurality of risk events.

16. The at least one non-transitory machine-readable storage medium of claim 13, such that the operations further comprise:

determining a risk score for each risk event of the plurality of risk events, wherein the first display screen includes an indication of the risk score of each risk event of the plurality of risk events, wherein each risk event of the plurality of the events contributes to an incident risk score for an incident, the incident being associated with all of the plurality of risk events; and causing display of a third display screen that includes a listing of a plurality of incidents, including the incident, wherein the third display screen indicates at least one of the plurality of incidents as being a risk notable with an associated risk score, and indicates at least one other of the plurality of incidents as being an ordinary notable.

17. A processing system comprising:

a communications interface;

a memory; and a processor coupled to the communications interface and the memory, and configured to execute instructions to cause the processing system to perform operations comprising:

accessing a plurality of event records, each of which is indicative of activity of an entity on a computer network;

identifying a plurality of risk events based on the plurality of event records, each risk event of the plurality of risk events being an event deemed indicative of a potential security threat to the computer network, wherein each risk event is associated with a corresponding risk object that generates the risk event, and wherein each risk event is associated with a corresponding threat object that is used, received, interacted with, or acted upon by the corresponding risk object in association with the risk event;

causing display of a first display screen that includes a first listing of a plurality of risk objects, each being associated with one or more risk events; and causing, in response to a first user input directed to a particular risk object, display of a second display screen that includes a second listing of one or more risk events associated with the particular risk object, each risk event in the second listing including an identification of a threat object associated with the risk event, the second display screen further including a graph corresponding to a selected risk event in the second listing, the graph comprises a first node representing a threat object associated with the selected risk event, one or more second nodes, each representing one of one or more network entities that have interacted with the threat object, and one or more edges, wherein each of the one or more edges connects the first node and one of the one or more second nodes representing relationships between the threat object represented by the first node and a network entity represented by the connected second node.

18. The processing system of claim 17, such that the operations further comprise:

determining a risk score for each risk event of the plurality of risk events, wherein the first display screen includes an indication of the risk score of each risk event of the plurality of risk events.

19. The processing system of claim 17, such that the operations further comprise:

determining a risk score for each risk event of the plurality of risk events, wherein the first display screen includes an indication of the risk score of each risk event of the plurality of risk events, wherein each risk event of the plurality of the events contributes to a risk score for an incident, the incident being associated with all of the plurality of risk events.

20. The processing system of claim 17, such that the operations further comprise:

determining a risk score for each risk event of the plurality of risk events, wherein the first display screen includes an indication of the risk score of each risk event of the plurality of risk events, wherein each risk event of the plurality of the events contributes to an incident risk score for an incident, the incident being associated with all of the plurality of risk events; and causing display of a third display screen that includes a listing of a plurality of incidents, including the incident, wherein the third display screen indicates at least one of the plurality of incidents as being a risk notable with an associated risk score, and indicates at least one other of the plurality of incidents as being an ordinary notable.

* * * * *